(12) United States Patent
Khilariwal et al.

(10) Patent No.: US 12,450,924 B2
(45) Date of Patent: Oct. 21, 2025

(54) METHOD AND SYSTEM FOR REAL-TIME MONITORING OF DRIVER IN A VEHICLE

(71) Applicant: HCL Technologies Limited, New Delhi (IN)

(72) Inventors: Mohan Khilariwal, Greater Noida (IN); Kunal Saurabh, Dhanbad (IN); Nitesh Bhardwaj, Lucknow (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 18/369,229

(22) Filed: Sep. 18, 2023

(65) Prior Publication Data

US 2025/0022291 A1 Jan. 16, 2025

(30) Foreign Application Priority Data

Jul. 12, 2023 (IN) .............................. 202311046856

(51) Int. Cl.
*G06V 20/59* (2022.01)
*B60Q 9/00* (2006.01)
*G07C 5/00* (2006.01)

(52) U.S. Cl.
CPC ............. *G06V 20/597* (2022.01); *B60Q 9/00* (2013.01); *G07C 5/008* (2013.01)

(58) Field of Classification Search
CPC ......... G06V 20/597; B60Q 9/00; G07C 5/008
See application file for complete search history.

(56) References Cited

U.S. PATENT DOCUMENTS

| | | | |
|---|---|---|---|
| 9,460,601 B2 | 10/2016 | Mimar | |
| 11,017,249 B2 | 5/2021 | Yu et al. | |
| 2014/0078282 A1 | 3/2014 | Aoki et al. | |
| 2014/0204193 A1* | 7/2014 | Zhang | G06V 40/18 348/78 |
| 2015/0154461 A1* | 6/2015 | Kitaura | G06V 20/597 348/148 |
| 2019/0213429 A1* | 7/2019 | Sicconi | G06F 3/012 |
| 2019/0236386 A1* | 8/2019 | Yu | A61B 3/145 |
| 2021/0088784 A1* | 3/2021 | Whitmire | G02B 27/0101 |
| 2021/0192693 A1* | 6/2021 | Jepson | G06N 20/20 |
| 2024/0378904 A1* | 11/2024 | Edwards | G06T 7/246 |

OTHER PUBLICATIONS

Meng-Che Chuang, Raja Bala, Edgar Andrés Bernal, Peter Paul, Aaron Burry; Estimating Gaze Direction of Vehicle Drivers Using a Smartphone Camera; Computer Vision and Pattern Recognition Workshops, IEEE;Jun. 23-28, 2014, IEEE, Columbus, OH, USA.

\* cited by examiner

*Primary Examiner* — Omer S Khan
(74) *Attorney, Agent, or Firm* — Kendal M. Sheets

(57) ABSTRACT

This disclosure relates to a system and method for real-time monitoring of driver in a vehicle. The method includes capturing at least one of a head movement, steering direction, and a direction of gaze of the driver. The method further includes determining a Plane of Vision (POV) for the driver based on end point of each side view mirrors, a rear-view mirror and bottom of a windshield of the vehicle. The method further includes determining a Region of Interest (ROI) for the driver based on one of a bounding box regression model and a direction of movement of the vehicle. The method further includes determining a Line of Gaze (LOG) for the driver based on the direction of gaze. The method further includes identifying a distraction level of the driver while driving the vehicle based on determining at least one of the POV, the ROI, and the LOG.

20 Claims, 15 Drawing Sheets

← 700

| Parameter 702 | Value 704 |
|---|---|
| Focal Length of camera | 658cm |
| Distance of driver from camera | 90cm |
| Left side mirror from camera | 120cm |
| Right side mirror from camera | 40cm |
| Height of camera on dashboard | 40cm |

FIG. 7

| Parameter 802 | Guideline for threshold limit values 804 | Monitored value by the system 806 | Measured by another calibrated instrument 808 |
|---|---|---|---|
| For measurement of yaw and pitch parameters: | | | |
| 1. | 120 cm left mirror | -4 degree (Yaw) | protractor |
| 2. | 40 cm right mirror | 4 degrees (Yaw) | protractor |
| 3. | Below dashboard | <0 (pitch) | protractor |
| 4. | Yaw direction and indicator direction same | Alarm is not raised | physical |
| For measurement of alarm: | | | |
| 5. | Yaw direction and indicator direction not same | Alarm is raised | physical |
| 6. | Steering wheel & indicator direction different and gaze in direction of steering wheel | No Alarm | physical |
| 7. | Steering wheel & indicator direction different and gaze in direction of indicator | Alarm | physical |

FIG. 8

METHOD AND SYSTEM FOR REAL-TIME MONITORING OF DRIVER IN A VEHICLE

TECHNICAL FIELD

This disclosure relates generally to vehicle safety systems, and more particularly to a system and method for real-time monitoring of driver in a vehicle using IoT-enabled sensors and Artificial Intelligence (AI).

BACKGROUND

Distracted driving has become a major concern and a leading cause of road accidents involving automobiles. The increasing use of mobile devices, in-car technologies, and other distractions diverts the driver's attention from the road, compromising their ability to react to potential hazards in a timely manner. Therefore, there is a need for an effective and practical solution to address this critical issue.

Existing solutions have attempted to monitor a driver's activities to assess their level of distraction. However, these solutions often have limitations that hinder their widespread adoption. Further, the existing systems are prone to false alarm due to environment like while looking at side mirror or rear-view mirror since gaze is in different direction while driving. Also, in case of turning, the driver needs to look in different direction which may leads to generation of the false alarm. Further, some of the existing systems require the driver to wear additional hardware, which may be uncomfortable, impractical, or intrusive. Others rely on mounting hardware on the vehicle itself, which may be expensive, complex, and may not consider crucial environment variables. Further, some of the existing systems has a drawback with respect to preserving PII (Personal Identifiable Information) and privacy of the driver and passenger.

Therefore, in order to provide solutions to the aforementioned drawback, there exists a need to develop a method and a system that captures environment variables for real-time monitoring of driver without necessitating additional hardware to be worn by the driver or mounted on the vehicle. By analyzing multiple factors, such as driver's gaze, speed of vehicle, direction of vehicle movement, light indicator usage, position of side view mirrors and rear-view mirror, the proposed method and system accurately estimate the driver's focus of attention and raise appropriate alerts only when distractions are detected. In order to protect the privacy and preserving PII, the proposed method and system incorporates data annonomization at the edge itself. If required the original data may be made available to the authorised authorities only.

SUMMARY

In one embodiment, a method for real-time monitoring of driver in a vehicle is disclosed. In one example, the method may include capturing at least one of a head movement, steering direction, and a direction of gaze of the driver present in the vehicle. The method may further include determining a Plane of Vision (POV) for the driver based on end point of each side view mirrors, a rear-view mirror and bottom of a windshield of the vehicle. The method may further include determining a Region of Interest (ROI) for the driver based on one of a bounding box regression model and a direction of movement of the vehicle. The method may further include determining a Line of Gaze (LOG) for the driver based on the direction of gaze. The method may further include identifying a distraction level of the driver while driving the vehicle based on determining at least one of the POV, the ROI, and the LOG.

In another embodiment, a system for real-time monitoring of driver in a vehicle is disclosed. In one example, the system may include a processor and a memory communicatively coupled to the processor. The memory store processor-executable instructions, which, on execution, may cause the processor to capture at least one of a head movement, steering direction, and a direction of gaze of the driver present in the vehicle. The processor-executable instructions, on execution, may further cause the processor to determine a Plane of Vision (POV) for the driver based on end point of each side view mirrors, a rear-view mirror and bottom of a windshield of the vehicle. The processor-executable instructions, on execution, may further cause the processor to determine a Region of Interest (ROI) for the driver based on one of a bounding box regression model and a direction of movement of the vehicle. The processor-executable instructions, on execution, may further cause the processor to determine a Line of Gaze (LOG) for the driver based on the direction of gaze. The processor-executable instructions, on execution, may further cause the processor to identify a distraction level of the driver while driving the vehicle based on determining at least one of the POV, the ROI, and the LOG.

In yet another embodiment, a non-transitory computer-readable medium storing computer-executable instruction for real-time monitoring of driver in a vehicle is disclosed. The stored instructions, when executed by a processor, may cause the processor to perform operations including capturing at least one of a head movement, steering direction, and a direction of gaze of the driver present in the vehicle. The operations may further include determining a Plane of Vision (POV) for the driver based on end point of each side view mirrors, a rear-view mirror and bottom of a windshield of the vehicle. The operations may further include determining a Region of Interest (ROI) for the driver based on one of a bounding box regression model and a direction of movement of the vehicle. The operations may further include determining a Line of Gaze (LOG) for the driver based on the direction of gaze. The operations may further include identifying a distraction level of the driver while driving the vehicle based on determining at least one of the POV, the ROI, and the LOG.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 is a Table depicting experimental parameters associated with implementation of a camera within a vehicle for real-time monitoring of a driver, in accordance with some embodiments of the present disclosure.

FIG. 8 is a Table depicting experimental data for real-time monitoring of driver in a vehicle, in accordance with some embodiments of the present disclosure.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
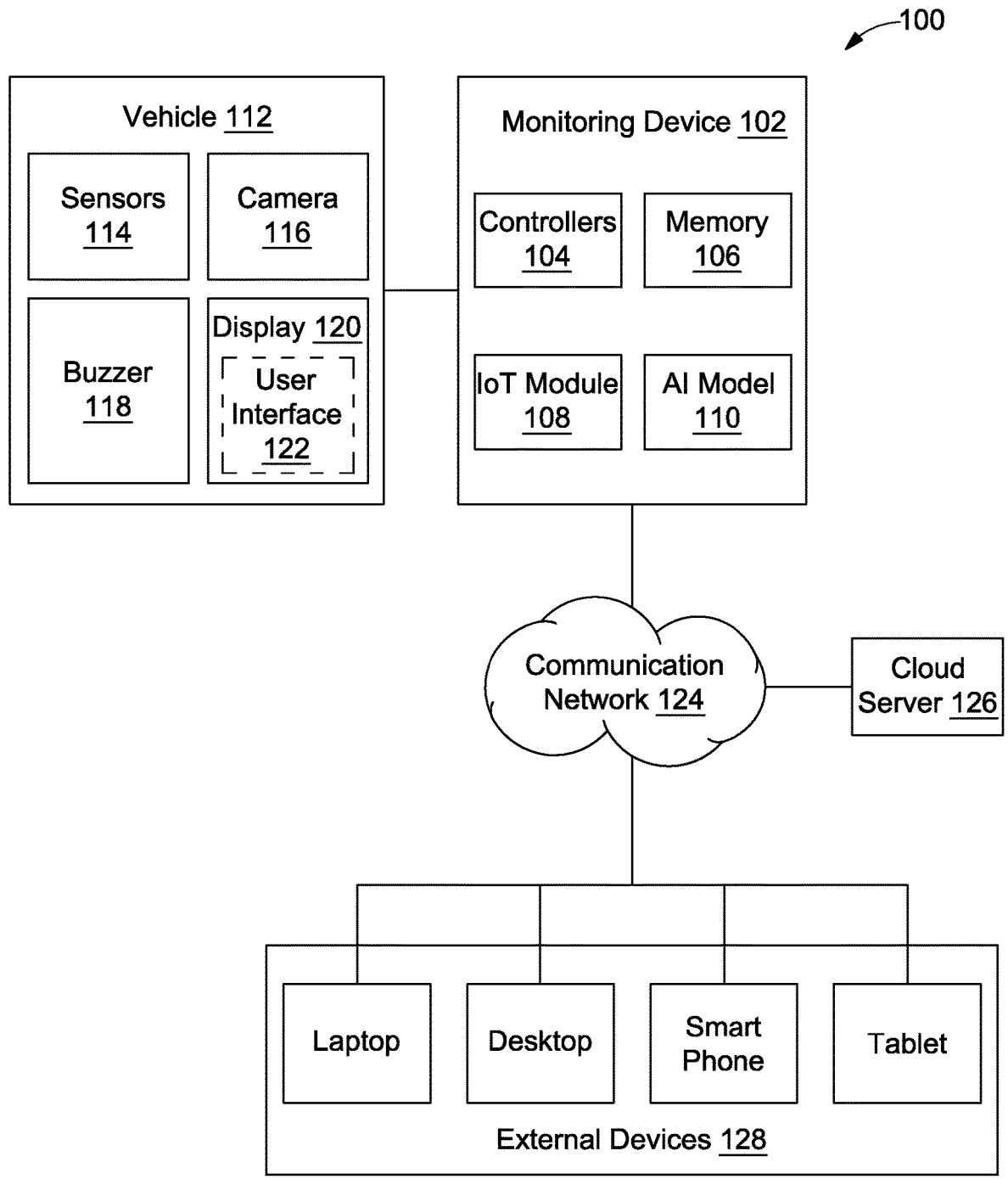
FIG. 1 illustrates a block diagram of a system for real-time monitoring of driver in a vehicle, in accordance with some embodiments of the present disclosure.

Referring now to FIG. 1, a block diagram of a system 100 for real-time monitoring of driver in a vehicle 112 is illustrated, in accordance with some embodiment of the present disclosure. The system 100 includes a monitoring device 102 that may be capable of real-time monitoring of the driver while driving the vehicle 112. The vehicle 112 may be commercial or non-commercial vehicles. Examples of commercial vehicles may include, but are not limited to, trucks, ambulance, police vehicle, buses, taxis, or ride sharing vehicles. Examples of non-commercial vehicles may include, but are not limited to, private cars, jeep, van, or recreational vehicles (RVs).

The monitoring device 102 may provide a real-time hazard prediction by accurately monitoring driver distraction. The system 100 incorporates IoT-enabled sensors and AI algorithms to accurately forecasts driver distraction before potential hazards arise, allowing for proactive intervention and improved safety.

As will be described in greater detail in conjunction with FIG. 2 to FIG. 11, in order to initiate the monitoring process, initially the camera 116 installed within the vehicle 112 may capture at least one of a head movement, a steering direction, or a direction of gaze of the driver present in the vehicle 112. Further, the monitoring device 102 may determine a Plane of Vision (POV) of the driver based on end point of each of side view mirrors, a rear-view mirror, and bottom of a windshield of the vehicle 112. Thereafter, the monitoring device 102 may determine a Region of Interest (ROI) for the driver based on one of a bounding box regression model or a direction of movement of the vehicle 112. Further, the monitoring device 102 may determine a Line of Gaze (LOG) of the driver based on the direction of gaze. Further, the monitoring device 102 may identify a distraction level of the driver while driving the vehicle based on at least one of the POV, the ROI, and the LOG, through the AI model 110.

As depicted via the present FIG. 1, the monitoring device 102 may include one or more controllers 104, a memory 106 (for example, a datalogger), an Internet of Things (IoT) module 108, and an Artificial Intelligence (AI) model 110. Examples of the monitoring device 102 may include, but are not limited to, a server, a desktop, a laptop, a notebook, a tablet, a smartphone, a mobile phone, an application server, or the like. The memory 106 may store instructions that, when executed by the processor 108, may cause the one or more controllers 104 to perform real-time monitoring of the driver.

The memory 106 may also store various data (e.g., head movement, direction of driver's gaze, steering direction of the vehicle 112, light indicator of the vehicle 112, speed of the vehicle 112, direction of movement of the vehicle 112, etc.) that may be captured, processed, and/or required by the monitoring device 102. The memory 104 may be a non-volatile memory (e.g., flash memory, Read Only Memory (ROM), Programmable ROM (PROM), Erasable PROM (EPROM), Electrically EPROM (EEPROM) memory, etc.)

or a volatile memory (e.g., Dynamic Random Access Memory (DRAM), Static Random-Access memory (SRAM), etc.).

The monitoring device 102 may be connected to the vehicle 112. The vehicle 112 may include one or more sensors 114 (for example, light indicator sensors, and speed sensor), a camera 116, a buzzer 118, and a display 120. It should be noted that the one or more sensors 114 may be IoT-enabled sensors.

In an embodiment, the camera 116 may be configured to capture at least one of head movement (e.g., yaw, pitch, and roll) of the driver, the steering direction, or the direction of gaze of the driver. The light indicator sensors provide information about a direction the vehicle 112 is turning or changing lanes. The speed sensor is configured to monitor a speed of the vehicle 112.

The IoT module 108 may act as an interface between the one or more sensors 114 and rest of the system 100. In particular, the IoT module 108 may be configured to collect data from the one or more sensors 114 of the vehicle 112 and transmit the collected data to the cloud server 126 over a communication network 124. The communication network 118 may be any wired or wireless communication network and the examples may include, but may be not limited to, the Internet, the Global System for Mobile (GSM), Short Message Services (SMS), E-mail, Wireless Local Area Network (WLAN), Wi-Fi, Long Term Evolution (LTE), Worldwide Interoperability for Microwave Access (WiMAX), and General Packet Radio Service (GPRS).

The AI model 110 may then use the collected data to predict instances of gaze failure while driving. In particular, AI model 110 may perform data analysis using computer vision (CV) techniques to determine where exactly the driver is looking (for example, looking at side mirrors, dashboard, road signs, or traffic signals) while driving. Based on determining, if driver's distraction is found to be genuine, the monitoring device 102 may then raise an alarm via the buzzer 118 to alert the driver.

In some embodiments, the cloud server 126 may interact with one or more external devices 128 over the communication network 118 to send the collected data to one of an interested person (for example, a vehicle owner, an insurance provider, etc.) for viewing it from a remote location. The one or more external devices 120 may include, but may not be limited to, a desktop, a laptop, a notebook, a netbook, a tablet, a smartphone, a remote server, a mobile phone, or another computing system/device.

The monitoring device 102 may interact with the driver of the vehicle 112 for sending and receiving data. In particular, the monitoring device 102 may interact with the driver via a user interface 122 accessible via the display 120 of the vehicle 112. Thus, for example, in some embodiments, the monitoring device 102 may render the user interface 122 to receive an alert (for example, an audio-visual warning) when the driver is found to be genuinely distracted.

Results obtained from the monitoring device 102 suggest that driver's 3-dimensional facial movement is influenced by various factors, such as location of side mirrors, rear-view mirror, and a placement of audio players in the vehicle 112. The monitoring device 102 takes these parameters into consideration before raising the alarm. For example, if the driver is looking at the side mirror, the alarm may not be raised instantly. However, if the driver keeps looking at the mirror for five successive frames, the monitoring device 102 may generate the alarm. In cases where the driver looks beyond the mirrors, the alarm may be raised instantly. Additionally, if the vehicle 112 has an outside camera that overlooks the direction of movement, false alarms for looking at road signs and traffic signals may be prevented.

In some embodiments, the monitoring device 102 may send, via the communication network 118, the alert corresponding to the driver's distraction to concerned authorities. The concerned authorities may then take necessary actions to provide safety to the driver whenever required.

Figure 2:
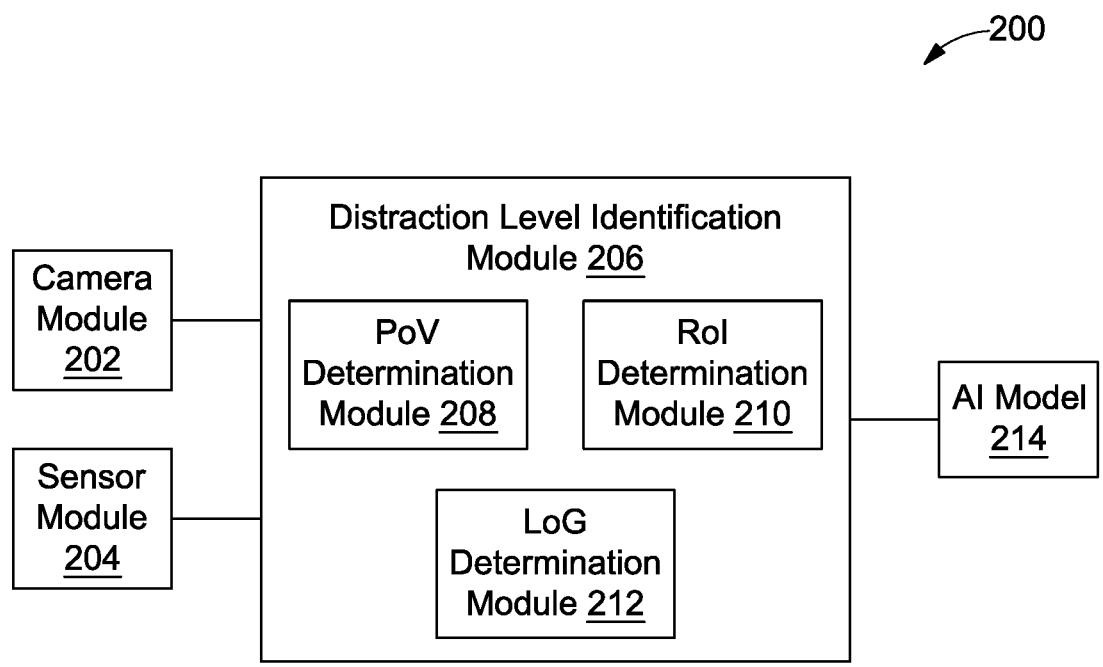
FIG. 2 illustrates a block diagram of various modules configured for real-time monitoring of driver in a vehicle, in accordance with some embodiments of the present disclosure.

Referring now to FIG. 2, is a block diagram 200 of various modules within the monitoring device 102 configured for real-time monitoring of driver in a vehicle 112 is illustrated, in accordance with some embodiments of the present disclosure. The block diagram 200 may include a camera module 202, a sensor module 204, a distraction identification module 206 and an AI model 214. It should be noted that the camera module 202 may be analogous to the camera 116, the sensor module 204 may be analogous to the one or more sensors 114, and the AI model 214 may be analogous to the AI model 110 of system 100.

The distraction identification module 206 may include a Plane of Vision (POV) determination module 208, a Region of Interest (ROI) determination module 210, and a Line of Gaze (LOG) determination module 212. After the driver start driving the vehicle 112, the camera module 202 begins to record a plurality of parameters associated with both the driver and the vehicle 112. The plurality of parameters may include a head movement (yaw, pitch, and role) of the driver, a steering direction of the vehicle 112, or a direction of gaze of the driver.

The sensor module 204 may include a light indicator sensor and a speed sensor. The light indicator sensor may provide information about intended direction of the vehicle 112 for turning or changing lanes. The speed sensor may determine a speed of the vehicle.

The data collected from the camera module 202 and sensor module 204 may be utilized by the distraction identification module 206 to determine distraction level of the driver while driving the vehicle 112. In order to determine the distraction level, initially, the POV determination module 208 may determine a Plane of Vision (POV) of the driver based on endpoints of each side view mirrors, a rear-view mirror, and bottom of a windshield. By considering these reference points, the monitoring device 102 may establish a general area or range within which the driver's vision is expected to be focused. This is further explained in conjunction with FIGS. 6A-6F.

Further, the ROI determination module 210 may determine a Region of Interest (ROI) for the driver. This may be accomplished using a bounding box regression technique and the direction of movement of the vehicle 112. The direction of movement of the vehicle is identified by monitoring the steering direction, light indicators of the vehicle, and speed of the vehicle. The ROI represents a particular area within the overall POV that is of interest for analyzing the driver's behavior and distractions.

The determination of the ROI may occur in two different scenarios. In a first scenario, the ROI is detected by utilizing a bounding box based on existing data from the same driver or drivers who share similar characteristics when they are in the driving seat. The existing data includes information about the driver's behavior, gaze patterns, and other relevant features.

In a second scenario when a new driver takes the driving seat, the ROI determination module 210 may employ a bounding box regression model to identify a new ROI that is specific to that particular driver. This approach allows the ROI determination module 210 to adapt and detect an appropriate ROI based on the unique characteristics and behavior of the new driver. This is further explained in conjunction with FIG. 4.

Further, the LOG determination module 212 may determine a Line of Gaze (LOG) of the driver based on the direction of gaze. The line of gaze refers to the direction in which the driver's eyes are focused. This may be determined by tracking the direction of the driver's gaze using the camera module 102. The LOG provides information on where the driver is looking within the determined ROI.

Once the POV, the ROI, and the LOG of the driver are determined, the monitoring device 102 may employ the AI model 214 to analyze the collected data and determine the distraction level of the driver while operating the vehicle. The AI model 214 may consider factors, such as the determined POV, the ROI, and the LOG. By analyzing the collected data, the AI model 214 may identify the distraction level of the driver. A method of identifying the distraction level of the driver based on analyzing the data is explained in greater detail in conjunction with FIG. 11 to FIG. 13.

It should be noted that all such aforementioned modules 202-214 may be represented as a single component or a combination of different components. Further, as will be appreciated by those skilled in the art, each of the modules 202-214 may reside, in whole or in parts, on one device or multiple devices in communication with each other. In some embodiments, each of the modules 202-214 may be implemented as dedicated hardware circuit comprising custom application-specific integrated circuit (ASIC) or gate arrays, off-the-shelf semiconductors such as logic chips, transistors, or other discrete components. Each of the modules 202-214 may also be implemented in a programmable hardware device such as a field programmable gate array (FPGA), programmable array logic, programmable logic device, and so forth. Alternatively, each of the modules 202-214 may be implemented in software for execution by various types of microcontrollers (e.g., controllers 104). An identified component of executable code may, for instance, include one or more physical or logical blocks of computer instructions, which may, for instance, be organized as an object, procedure, function, or other construct. Nevertheless, the executables of an identified component need not be physically located together but may include disparate instructions stored in different locations which, when joined logically together, include the component and achieve the stated purpose of the component. Indeed, a component of executable code could be a single instruction, or many instructions, and may even be distributed over several different code segments, among different applications, and across several memory devices.

Figure 3:
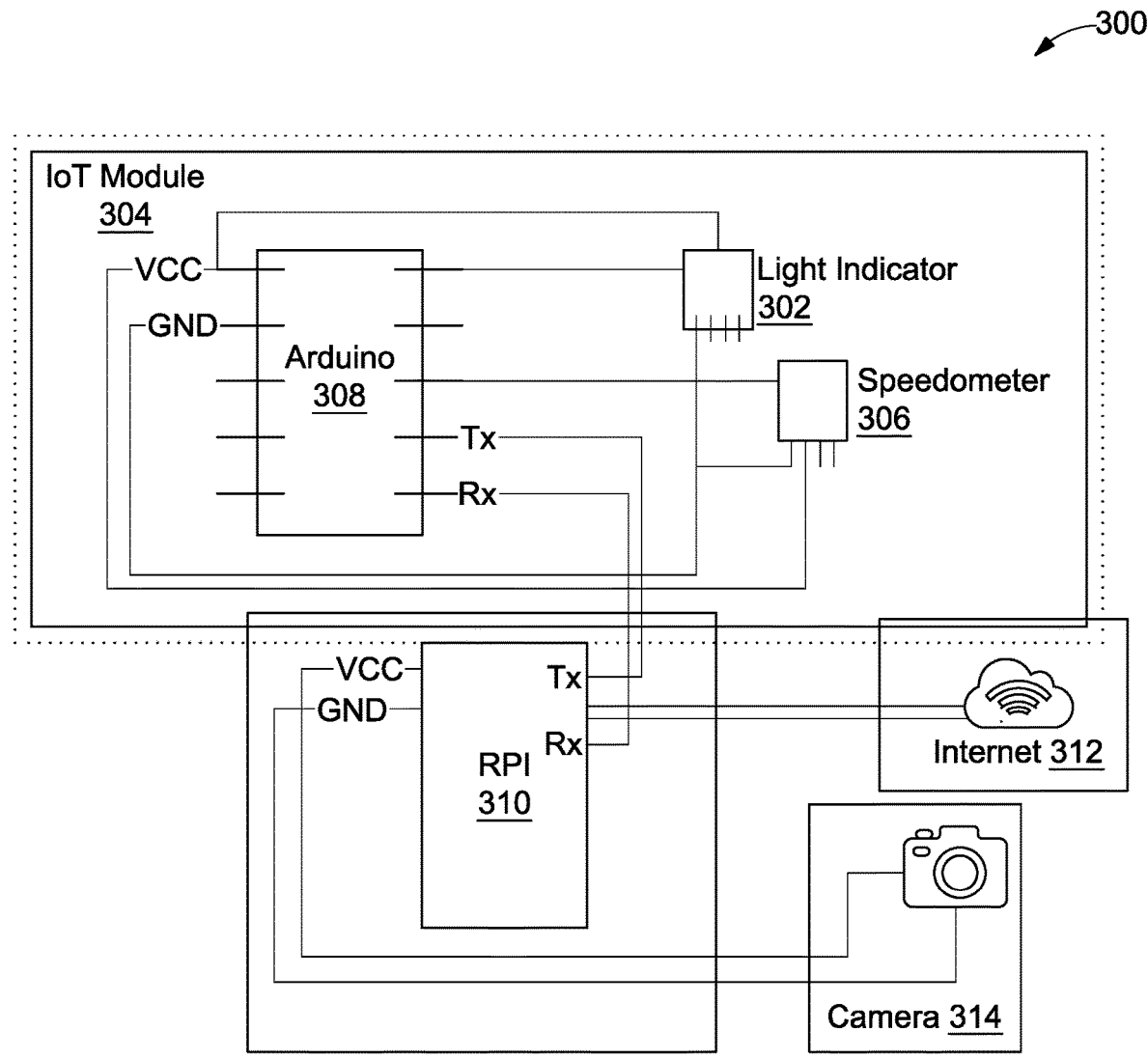
FIG. 3 illustrates a circuit diagram of a monitoring device for real-time monitoring of driver in a vehicle, in accordance with some embodiments of the present disclosure.

Referring now to FIG. 3, a circuit diagram 300 of the monitoring device 102 for real-time monitoring of driver in the vehicle 112 is illustrated, in accordance with some embodiments of the present disclosure. The circuit diagram 300 may include at least two microcontrollers (for example, an Arduino microcontroller 308 and a Raspberry Pi (RPI) microcontroller 310), an IoT module 304, light indicators 302, a speedometer 306, an internet module 312, and a camera module 314.

The Arduino microcontroller 308 is an application board used for analog signal input and has channels (ADC0, ADC1, ADC2 . . . ADC7). It requires a power supply of VCC (+5V or +3.3V), GND connected to ground, and has a RAW pin for unregulated power supply (+5 V to +12 V). The Arduino microcontroller 308 has a 10-bit resolution and supports a maximum current of 40 mA per I/O pin.

The light indicators 302, the speedometer 306, and the IoT module 304 may be integrated with the Arduino microcontroller 308 to monitor driving environment (for example, indicator direction and speed) and minimize false alarms by determining if the vehicle is moving in the direction of the driver's gaze or not. The light indicator 302 provides information about a direction of rotation of the vehicle, such as turning or changing lanes. The speedometer 306 measures and monitors the speed of the vehicle.

A general working principle of speedometer within the vehicle may be explained as follows:

A magnet connected to one of the wheels, usually attached to a driveshaft, rotates at a high speed as the vehicle moves forward. Alternatively, multiple magnets may be used for better accuracy.

As the magnet rotates, it passes by a Hall-effect sensor or another type of magnetic sensor that is positioned nearby. The magnetic sensor is designed to detect changes in the magnetic field.

When the magnet passes the sensor, the magnetic field from the magnet triggers the sensor, generating a signal. This signal is then amplified by a circuit, which enhances its strength and prepares it for further processing.

The amplified signals from the sensor are then translated into two essential measurements i.e., speed and distance travelled. The speed measurement is used to determine the instantaneous speed of the vehicle, while the distance measurement calculates the distance covered by the vehicle over time.

The speed and distance measurements are displayed simultaneously on a digital display located on the dashboard of the vehicle. This display serves as both a speedometer and an odometer. The speedometer indicates the current speed of the vehicle, typically in kilometers per hour or miles per hour. The odometer, on the other hand, shows the total distance travelled by the vehicle since it was last reset.

The IoT module 304 plays a significant role in making the monitoring device 102 connected and capable of utilizing IoT technology. It enables collection and transmission of data from various sensors (for example, light indicator sensor and speed sensor) to a centralized location (for example, a cloud server) or control room. The IoT module 304 ensures real-time monitoring and analysis of the driver's behavior by connecting to the internet or other communication networks.

The RPI microcontroller 310 (for example, Raspberry Pi 4B) is equipped with a Broadcom BCM2711 processor and may have varying amounts of LPDDR4-3200 SDRAM (1 GB, 2 GB, 4 GB, or 8 GB). Further, the RPI microcontroller 310 offers wireless connectivity with IEEE 802.11ac, Bluetooth 5.0, and BLE, as well as Gigabit Ethernet and USB ports (2 USB 3.0 and 2 USB 2.0). Further, the RPI microcontroller 310 features GPIO headers, micro-HDMI ports, MIPI DSI and CSI camera/display ports, audio and video ports, and support for H.265 and H.264 video decoding. Additionally, the RPI microcontroller 310 may be powered via USB-C connector or GPIO header. The RPI microcontroller 310 provides computational capabilities for running an AI model and processing data from the camera module 314.

The integration of the camera module 314 and the internet module 312 with the RPI microcontroller 310 enables the detection of head movement, including yaw, pitch, and roll, of the driver. The RPI microcontroller 310 combined with the camera module 314 constitute the AI model of the monitoring device 102. The camera module 314 captures visual like images or video of the driver's face and head movement. These visual inputs are then processed by the AI model to analyze the head movement to identify distraction and evaluate the driver's level of attention while driving.

Therefore, in order to analyze and interpret the collected data of the camera module 314, the AI model may utilize a combination of various prediction techniques, including artificial neural networks, transfer learning, and utilization of the vehicle's indicator, speed, and steering information.

The artificial neural network is a computational model inspired by the structure and function of biological neural networks. The artificial neural network is designed to recognize patterns and make predictions based on input data. In context of real-time monitoring of the driver, the artificial neural network is trained to analyze the collected data and identify patterns related to driver distractions and attention levels.

The transfer learning is another technique in machine learning where knowledge gained from solving one problem is applied to another related problem. In the driver monitoring system, transfer learning is used to leverage pre-trained models or knowledge from similar tasks to improve the performance and accuracy of the AI model. By utilizing transfer learning, the monitoring device may benefit from existing knowledge and reduce the amount of training data needed.

The monitoring device may also consider various parameters related to the vehicle, such as the indicator, speed, and steering. These parameters provide additional contextual information that helps in determining the driver's behavior and distractions. For example, the indicator may indicate the intention of the driver to change lanes or turn, which may be considered in evaluating the distraction level of the driver.

The internet module 312 may be responsible for establishing an internet connection and enabling data transmission over the internet. It allows the monitoring device 102 to send driving-related data, collected from various sensors to the concerned authorities in real-time for remote monitoring, analysis, and taking appropriate actions.

In some embodiments, the internet module 312 may employ a GSM module SIM 900A. The GSM module SIM 900A is a communication module that enables connectivity with the GSM/GPRS network. It operates on the 900/1800 MHz frequency bands and supports data transmission over GPRS. The GSM module has a configurable baud rate, an internal TCP/IP stack for internet connectivity, and may be controlled using AT commands. It is compact in size and consumes low power, making it suitable for the monitoring device.

In an exemplary embodiment, the monitoring system utilizing AI and IoT techniques has been tested through a series of experiments conducted in a laboratory under simulated conditions. The system has been powered by a 5V power supply and operated continuously for an extended period of time. Simulated voltage inputs have been provided to the microcontroller modules, namely Arduino and Raspberry Pi. These microcontrollers have been responsible for controlling various components such as the vehicle's indicator, speedometer, and capturing facial orientation (yaw, pitch, and roll) through the camera. The alarm operation has also been controlled by the microcontrollers, which have been connected to the vehicle's power supply equipped with a charge regulator and mounting panel. Additionally, different sensors have been integrated with the wireless internet module to facilitate the transmission of data to the relevant authorities. This comprehensive integration of AI, IoT, and wireless capabilities has made the driver monitoring device and/or system a standalone and long-range wireless solution.

It should be noted that this example has been provided for illustrative purposes only and does not limit the scope of the present disclosure.

The monitoring device 102 employing the AI and IoT techniques is specifically developed to gather essential information regarding driving habits of the driver. The monitoring device 102 uses the vehicle's indicator and speedometer, as well as an orientation of driver's face while driving, to determine a line of gaze, generate alarms, and calculate distraction level per minute. This data is then inputted into microcontrollers, such as Arduino and Raspberry Pi to decide on whether an alarm is to be triggered or not.

Moreover, to enhance accuracy and reduce false alarms, the monitoring device 102 also considers the dimensions of the vehicle and parameters such as a height and distance of the driver with respect to the camera. By considering these parameters, the monitoring device 102 may provide a more precise measure of the driver's behavior and driving nature. Values of these parameters are illustrated in Table 700 of FIG. 7.

Figure 4:
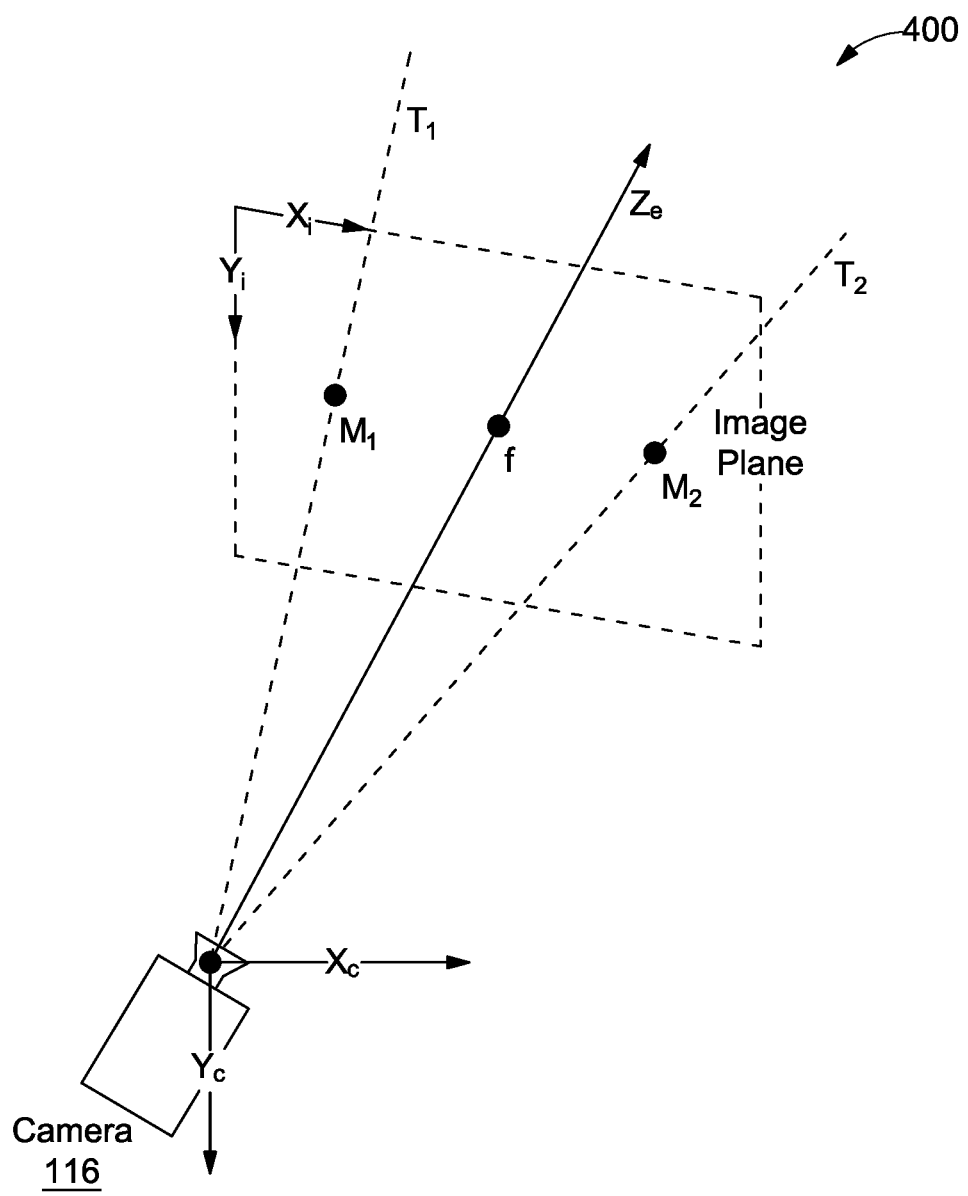
FIG. 4 is a representation for calculating angle of Region of Interest (ROI) with respect to a camera, in accordance with some embodiments of the present disclosure.

Referring now to FIG. 4, a representation 400 for calculating angle of ROI with respect to a camera is illustrated, in accordance with some embodiments of the present disclosure. As mentioned earlier in reference to FIG. 2, the ROI determination module 210 may determine the ROI for the driver based on the bounding box regression model.

Apart from the determination of ROI, the determination module 210 may also calculate angle of the ROI with respect to the camera 116. To achieve this, the determination module 210 verifies whether the angle of the ROI is within predefined boundaries or outside of them along with duration of frame, based on the speed of the vehicle. The calculation of the angle of the ROI may be performed as follows:

Assuming focal length of the camera lens: FI=8 mm. Resolution of the camera lens: R=1280*1024 pixel.

To accurately determine a position of objects in an image captured by the camera 116, it is necessary to calibrate the camera 116. However, for initial approximations, some simplified calculations may be utilized. In this explanation, the image coordinate system (Xi, Yi) and the camera coordinate system (Xc, Yc, Zc) may be used, which are commonly employed in computer vision libraries like OpenCV.

As shown in present FIGS. 4, M1 and M2 are two image points, which may be the boundaries of the image of the object of interest, and the corresponding rays r1 and r2 projecting them to the camera center. To simplify calculations, the focal length is converted to pixels. Using a dot pitch of 4.8 μm (micrometers), the width of the sensor is determined as 4.8*1280 μm=6.14 mm. By setting up a proportion, the value of f_pix (focal length in pixels) is calculated as 1667 pixels.

Further, a pinhole camera matrix (K) is constructed using the focal length. It assumes the camera's focal axis is orthogonal to the image and intersects it at the image's center. The matrix is defined as: K=np.array ([[1667, 0, 640], [0, 1667, 512], [0, 0, 1]]).

Given a 3D point M=(X, Y, Z) in camera coordinates, the image coordinates (x, y) of its projection onto the image are computed using the pinhole camera matrix:

$$N = K.dot(M)$$

$$x, y = N[0]/N[2], N[1]/N[2]$$

Given a pair of pixel coordinates (x, y), the 3D ray (r) back-projecting that pixel into 3D space is calculated using the inverse of the pinhole camera matrix:

$$Ki = np.linalg.inv(K)$$

$$r = Ki.dot([x, y, 1.0])$$

This ray represents the line passing through the camera center and the pixel (x, y). By adjusting the scalar value(s) in the equation R=s*r, different 3D points (R) may be obtained lying on the same line. By back-projecting two boundary image points (p1=(x1, y1) and p2=(x2, y2)) into 3D space, the rays r1 and r2 are obtained. The angle between these rays is calculated using the dot product formula:

$$\cos\_angle = r1.dot(r2)/(np.linalg.norm(r1)*np.linalg.norm(r2))$$

$$angle\_radians = np.acos(\cos\_angle)$$

It is to be noted that these formulae provide a first approximation. In reality, cameras have nonlinear lens distortion, and their focal axes may be slightly decentered with respect to the image. These issues are typically addressed through camera calibration techniques.

Figure 5:
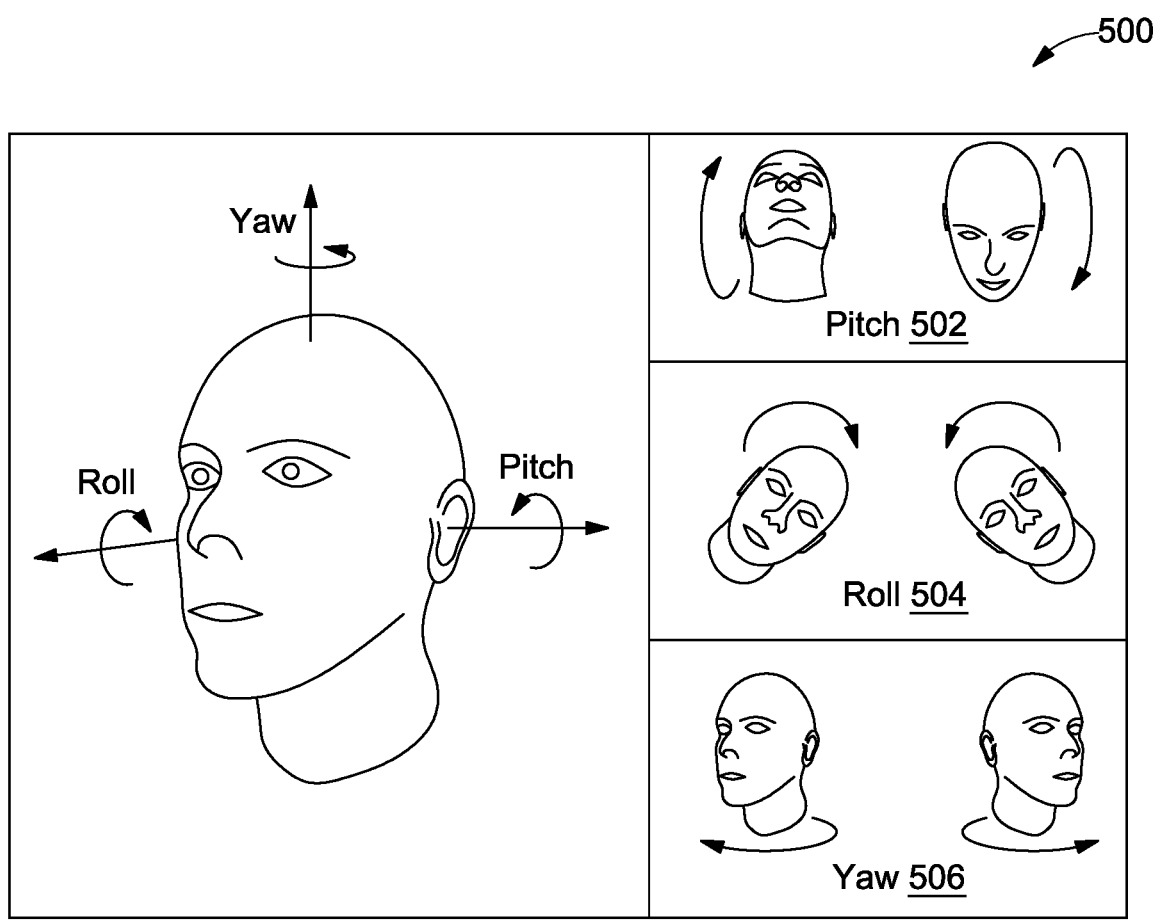
FIG. 5 is a representation for detecting pitch, yaw and roll of a driver's face, in accordance with some embodiments of the present disclosure.

Referring now to FIG. 5, a representation 500 for detecting pitch, yaw and roll of a driver's face is illustrated, in accordance with some embodiments of the present disclosure. Once the image is detected and the boundary points are determined, a pitch 502, a yaw 506, and a roll 504 of the driver's face may be detected. These measurements provide information about an orientation and movement of the driver's head, which is valuable for detecting a level of attention and detecting any potential distractions.

The monitoring device may utilize pitch, yaw, and roll angles to determine the movement of the driver's face along the y-axis and x-axis. These angles play a crucial role in calculating a permissible range of movement for the driver without triggering an alarm. If necessary, the monitoring device may instantly raise the alarm based on an extent of movement indicated by these angles. The driver's 3-dimensional facial movement is influenced by various factors, including a positioning of side mirrors, a rearview mirror, and even a placement of audio devices within the vehicle. Thus, the monitoring device may also take these factors into account to ensure accurate detection and alarm generation.

Additionally, in order to protect a privacy of in-cabin driver, the monitoring device incorporates anonymization techniques. In particular, instead of transmitting an original image of the driver to a remote server or a concern authority, the monitoring device anonymizes the entire image data to ensure privacy. The anonymization process maintains the distribution of data while concealing the driver's identity. If required for specific authorities or special cases, the anonymized image may be reconstructed. This approach of anonymization is crucial to maintain a trust of users in the monitoring system.

The present disclosure utilizes a generative adversarial network (GAN) and masking based in-cabin monitoring approach for attention detection of the driver. This approach generates a virtual face that replicates real-facial expressions while incorporating contextual masking to provide facial anonymity to the driver during monitoring. This approach enables the system to provide essential facial information for detection and monitoring purposes while avoiding any potential privacy concerns or irregular situations.

Referring now to FIGS. 6A-6F Illustrate exemplary visuals 600 of a driver in various scenarios, showcasing their Plane of Vision (POV), Line of Gaze (LOG), and Region of Interest (ROI). Through these visuals, the monitoring device may calculate the alignment of the driver's gaze with a direction of vehicle movement, thereby enabling detection of potential deviations from a predefined POV.

Figures 6A, 6B:
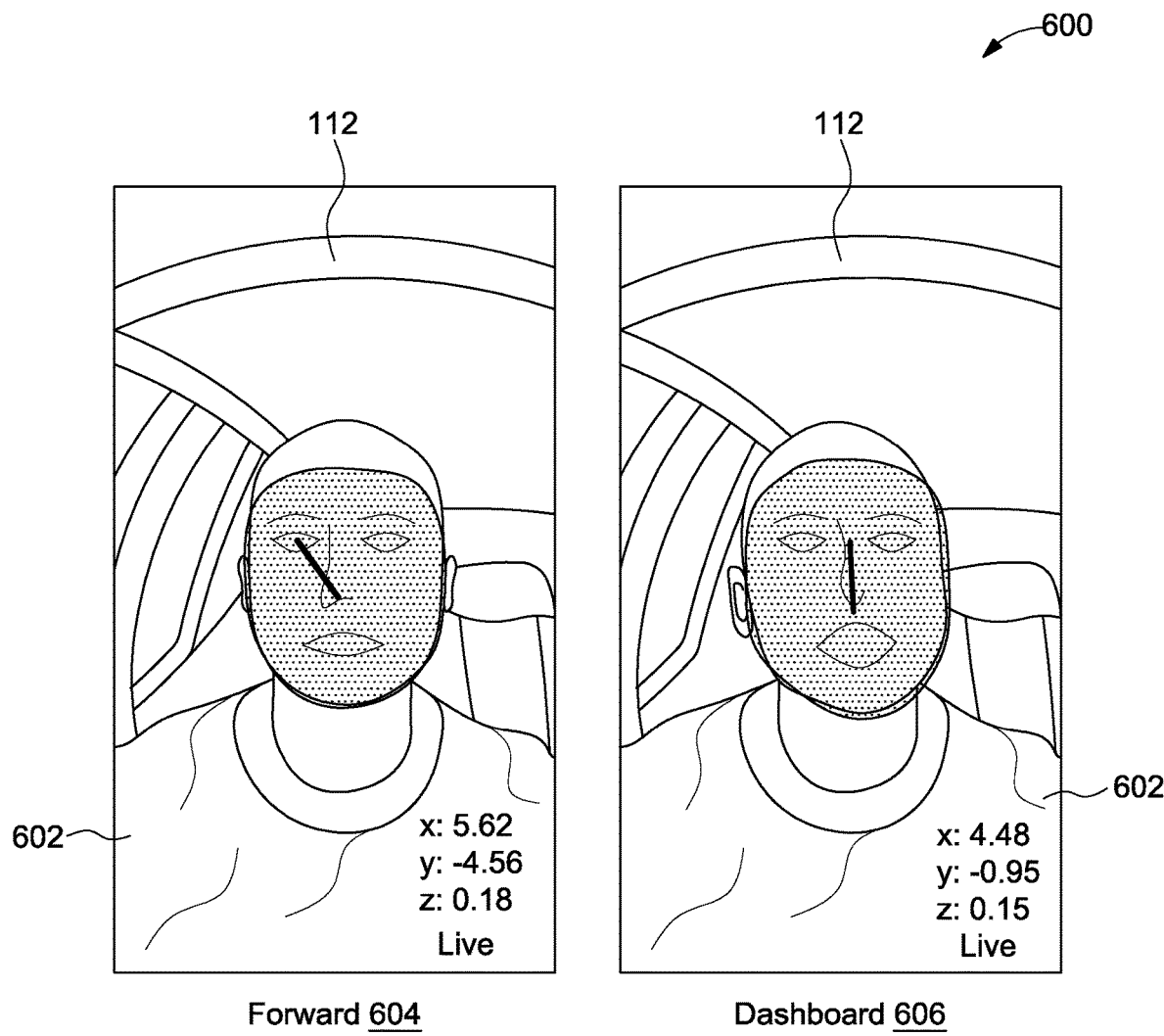
FIGS. 6A-6F Illustrate exemplary visuals of a driver in various scenarios, in accordance with some embodiments of the present disclosure.

To ensure the prevention of false alarms, it is essential to identify three major zones within the vehicle i.e., extreme left side mirror, right side mirror middle and above and below dashboard. These zones play a crucial role in determining the permissible range of head movement without triggering unnecessary alerts. For example, FIG. 6A depicts the driver is looking forward, directing their gaze straight towards the road ahead with coordinates (x: 5.62, y: −4.56, z: 0.18). FIG. 6B depicts driver's attention shifting towards a dashboard of the vehicle with coordinates (x: 4.48, y: −0.95, z: 0.15), indicating a focus on an instrument panel or relevant controls. Further, FIG. 6C depicts the driver is observed looking at a right side mirror with the coordinates (x: 8.76, y: −29.12, z: −0.65), suggesting a visual check of the surroundings or the adjacent lane on the right side of the vehicle.

Figures 6C, 6D:
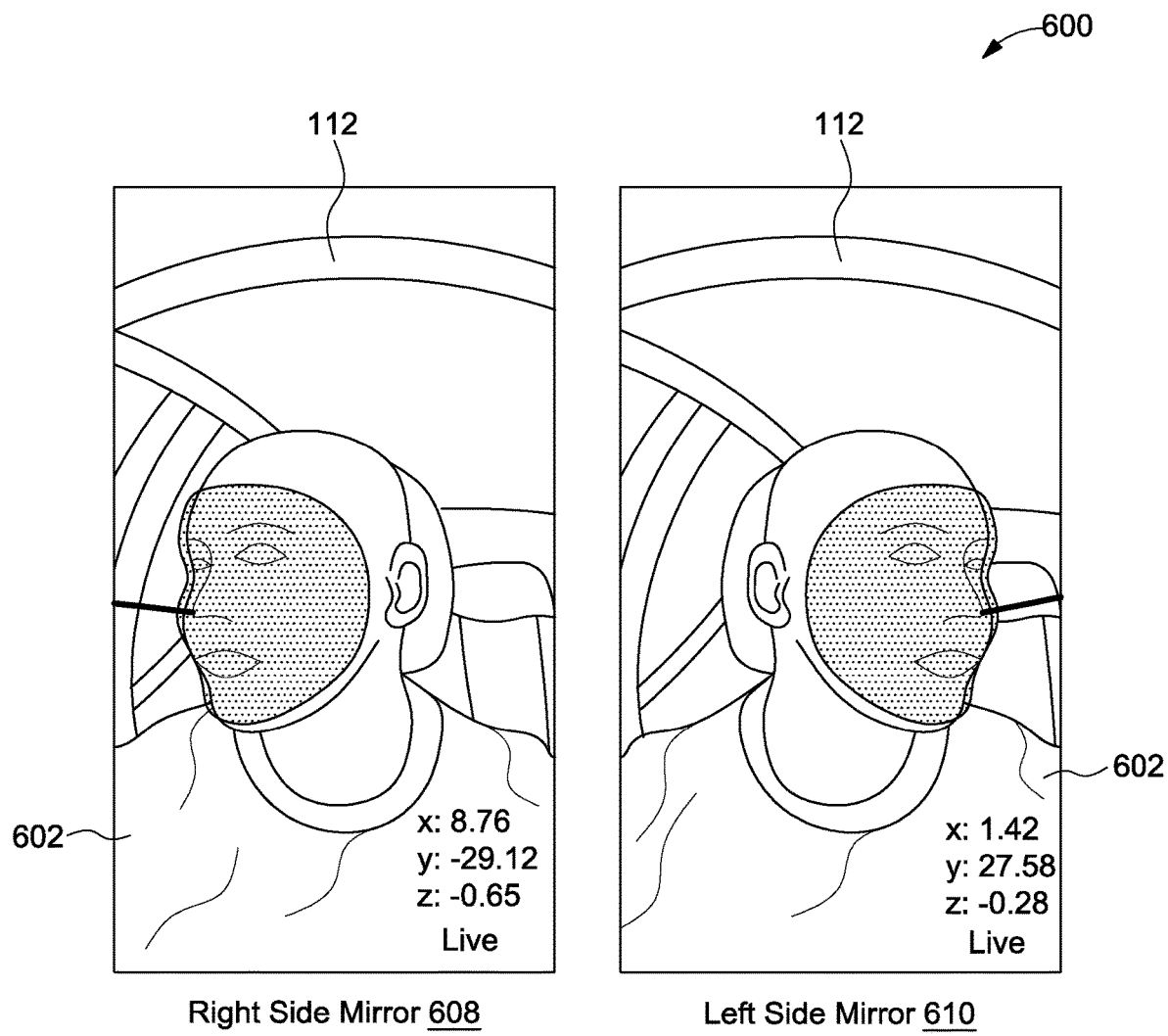
Figures 6E, 6F:
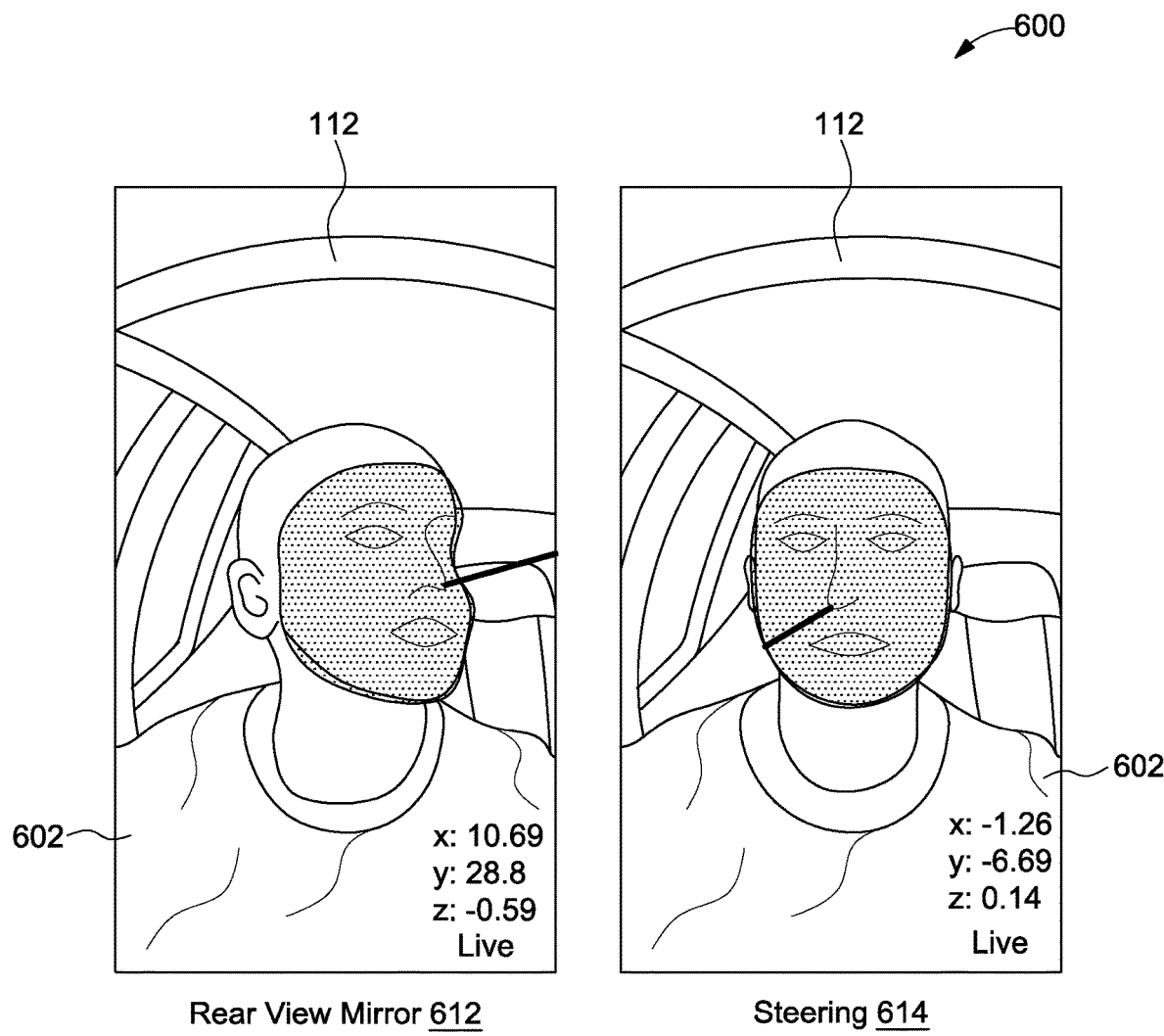

Further, FIG. 6D depicts the driver's gaze directed at a left side mirror with the coordinates (x: 8.76, y: −29.12, z: −0.65), indicating a visual check of the surroundings or an adjacent lane on the left side of the vehicle. Further, FIG. 6E depicts the driver is seen looking at the rear-view mirror with the coordinates (x: 10.69, y: 28.8, z: −0.59), indicating a check of the traffic or surroundings behind the vehicle. Furthermore, as depicted in FIG. 6F, the driver's attention is focused on a steering wheel with the coordinates (x: −1.26, y: −6.69, z: 0.14), representing a normal driving scenario where the driver is actively engaged in controlling the vehicle. These coordinate values provide information about the orientation of the driver's gaze in three-dimensional space, allowing for the determination and analysis of the driver's visual focus and attention in different scenarios.

To capture and determine the POV in real time, several components and algorithms are utilized. For example, a camera used may be a Sony IMX471 with a specification of 16 megapixels and fixed focus. The algorithm employed may be a Mediapipe Face Mesh, capable of detecting 468 landmarks in real time with specific confidence thresholds. It should be noted that these components and algorithms in the present disclosure are used for experimental purposes and may be configured differently depending on the specific vehicle and the corresponding necessary hardware used.

To calculate angle of the driver's gaze, the obtained image may be normalized, and a reference 3D point may be taken as the camera coordinates to map it down to the image plane. Landmarks such as the nose, mouth, eyes, and ears may be used to estimate the driver's pose by converting these points into 3D coordinates. A line is drawn on the nose landmark to determine the direction of the driver's gaze.

The focal length and intrinsic camera parameters, including a camera matrix and distortion parameters, are set. The camera matrix may be defined by the focal length and the dimensions of the image. The QR matrix decomposition may be employed to calculate the angles along the three axes (x, y, z), which are then normalized and converted back into the coordinate system by multiplying them by 360 degrees.

The vehicle's dimensions may be utilized to detect the driver's gaze direction accurately. By drawing a line on the nose landmark and scaling it based on the direction of the driver's gaze, the monitoring device may determine the alignment between the line of view and the driving direction. If the line of view aligns with the driving direction, no alarm is generated. However, if the direction of the driver's gaze deviates from the driving direction, an alarm is triggered. Special attention is given to situations involving vehicle turns, where the alarm is generated based on the duration for which the driver is not looking along the driving line.

The output visualization includes information about the driver's direction of view, such as looking in the left side mirror, looking at the dashboard, looking in the right side mirror, or looking in the rear-view mirror. Additionally, a visual alarm is provided to warn the driver when necessary.

In a more elaborative way, the monitoring device may consider relationship between the direction of movement of the vehicle and the driver's line of gaze. If the driver's line of gaze aligns with the direction of movement, and if the line of gaze remains within the plane of vision determined by the dimensions of the vehicle for a specified number of frames, no alarm is raised. This accounts for situations where the driver may be looking at the rear-view mirror, side mirrors, or engaged in turning the vehicle or changing lanes.

However, if the driver's line of gaze extends beyond the predetermined plane of vision, such as looking beyond the side mirrors or below the dashboard, an alarm may be raised instantly. This indicates that the driver's attention is diverted from a primary field of view required for safe driving. By monitoring and comparing the driver's line of gaze with the direction of movement and the predefined plane of vision, the monitoring device may effectively detect potentially hazardous situations where the driver's visual attention is outside the expected range.

FIG. 7 is a Table 700 depicting experimental parameters associated with implementation of a camera within a vehicle for real-time monitoring of a driver, in accordance with some embodiments of the present disclosure. During deployment of a monitoring device in a vehicle, careful consideration is to be taken for a placement of the camera at a specified distance and height on the dashboard, as well as the distance and height of the driver. The table 700 represents essential information for understanding the camera's positioning and its relationship to various components within the vehicle.

First column of the Table 700 depicts name of parameter 702. Second column of the Table 700 depicts their corresponding value 704. For example, the parameter 'Focal Length of camera' lens is set to a value 858 cm. The parameter 'Distance of driver from camera' indicate that the driver is positioned at a distance of 90 cm from the camera. This distance plays a crucial role in accurately capturing the driver's facial orientation and gaze direction. The parameter 'Left side mirror from camera' indicate that the left side mirror is located at a distance of 120 cm from the camera. This information is important for assessing the driver's visual attention towards the left side of the vehicle.

The parameter 'Right side mirror from camera' indicate that the right side mirror is positioned at a distance of 40 cm from the camera. This measurement helps to evaluate the driver's visual focus on the right side of the vehicle. The parameter 'Height of camera on dashboard' indicate that the camera is mounted at a height of 40 cm on the dashboard of the vehicle. This height placement ensures an optimal perspective for monitoring the driver's facial expressions and gaze movements.

By considering these parameter values, the monitoring device may accurately analyze a behavior and attention of the driver within the vehicle. The combination of the camera's focal length, the driver's distance from the camera, and the positioning of the camera relative to the vehicle's mirrors and dashboard contributes to the monitoring device ability to capture relevant visual cues for monitoring the driver effectively. It should be noted that these values are used for experimental purposes and may be configured differently, depending on the specific vehicle and the corresponding necessary hardware used.

Referring now to FIG. 8, a Table 800 depicting experimental data collected during the real-time monitoring of a driver in a vehicle is illustrated, in accordance with some embodiments of the present disclosure.

The experiment may be performed by integration of a developed monitoring system into the vehicle, with the system being powered by the vehicle's power source equipped with a charge regulator. The system performance were evaluated over an extended duration using the power supply of the vehicle. Throughout the experiment, system parameters were continuously monitored and compared between the developed system and a calibrated system for validation. Particular focus were given to a measurement of yaw and pitch parameters. These measurements were obtained using the developed system and transmitted through a microcontroller. The results obtained from the experiment demonstrated that accuracy of the developed system ranged between 96% to 99%.

To further assess the system's functionality, various artificial conditions were created near the sensors, manipulating the data related to pitch and yaw beyond permissible limits. In response to these conditions, the system accurately displayed the corresponding values on the display unit and triggered audio-visual alarms and SMS notifications to a concerned authority.

With reference to the present FIG. 8, the Table 800 represents specific experimental data obtained during the evaluation process. The Table 800 includes parameters 802, guideline threshold limit values 804, values monitored by the system 806, and values measured by another calibrated instrument 810. The data recorded in Table 800 includes measurements related to yaw and pitch parameters, as well as alarm conditions.

For the measurement of yaw and pitch parameters, specific distances from the vehicle's left mirror (120 cm) and right mirror (40 cm) is considered. The monitored values of yaw and pitch, such as −4 degrees (Yaw) for the left mirror and 4 degrees (Yaw) for the right mirror, is compared with measurements obtained using a protractor, and the calibrated instrument 808.

Regarding alarm measurements, different scenarios are evaluated. For instance, when the yaw direction and indicator direction are same, no alarm is raised. Conversely, if the yaw direction and indicator direction are different, an alarm is raised. Similarly, the positions of the steering wheel, indicator, and the driver's gaze direction are considered to determine alarm generation.

In some embodiments, field data may be collected for the deployment of the monitoring system. The field data may include both metadata and generated data. The metadata provides essential information about the vehicle and its components. This may include details such as the make and model of the vehicle, dimensions of the vehicle (including length, width, height, and information related to wheelbase length, trunk, cargo capacity, ground clearance, and other specifications), driver seat movement specifications, distance of the camera from the driver's seat, dimensions of rearview mirrors, and dimensions of sideview mirrors on both sides of the vehicle.

On the other hand, the generated data may include various time series data points that may be crucial for monitoring and analyzing the driver's behavior. The driver video, captured in real-time, serves as a primary source of data. Extracted from the live video stream, individual image frames are analyzed to gather valuable information. The frames are processed to determine bounding box dimensions, enabling the tracking and analysis of the driver's face.

In addition to visual data, other parameters related to the vehicle and driver are recorded. These include the direction of travel of the vehicle, the speed at which it is moving, and the real-time geographical location obtained through latitude and longitude coordinates. Furthermore, the angle of the driver's eye movement with respect to the camera is measured in degrees, providing valuable information about the driver's visual focus.

To facilitate data management and synchronization, timestamps are assigned to all collected data, enabling precise tracking and correlation of events. The microcontroller modules play a vital role in processing and organizing the data. The image processing module handles tasks such as converting the video into frames, extracting bounding box dimensions, and assigning timestamps. Additionally, the sensor data module collects relevant information from the vehicle's indicators, including the direction of movement, speed, and geolocation, which are also timestamped.

The combination of the metadata, the generated data, and the integrated microcontroller modules allows for the creation of calculated features. These features involve the analysis and computation of specific driver monitoring parameters, enabling a thorough understanding of the driver's behavior and facilitating the generation of alerts or alarms when necessary.

Figure 9:
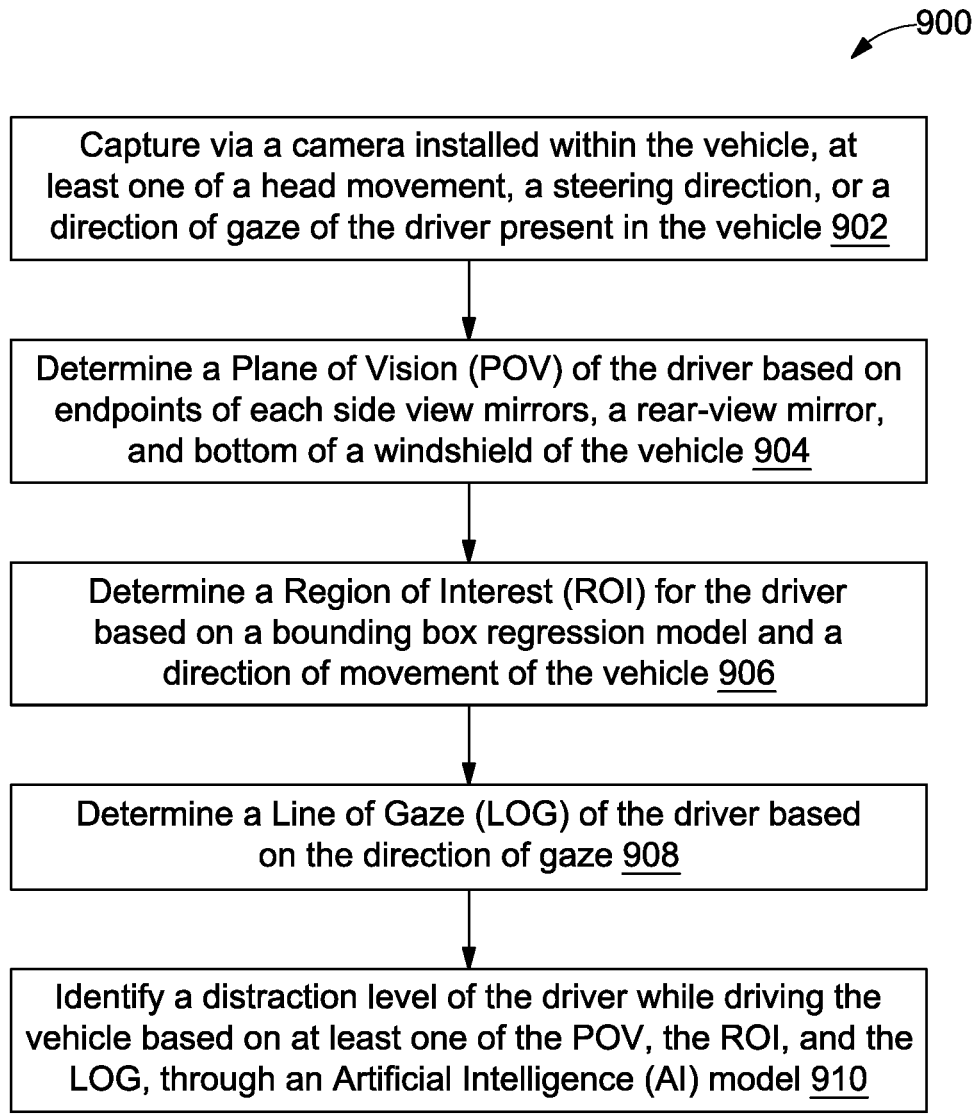
FIG. 9 is a flowchart of a method for real-time monitoring of driver in a vehicle, in accordance with some embodiments of the present disclosure.

Referring now to FIG. 9 is a flowchart of a method 900 for real-time monitoring of driver in a vehicle, in accordance with some embodiments of the present disclosure. It should be noted that all the steps 902-910 may be executed by the modules 202-214. At step 902, at least one of a head movement, a steering direction, or a direction of gaze of the driver present in the vehicle may be captured via a camera installed within the vehicle. These captured data may be useful in determining driver's behavior and attention while operating the vehicle.

At step 904, a Plane of Vision (POV) of the driver may be determined based on endpoints of each side view mirrors, a rear-view mirror, and bottom of a windshield of the vehicle. In some embodiments, the POV may be determined through the POV determination module 208.

In other words, to determine the POV of the driver, the POV determination module 208 may consider several reference points within the vehicle. It analyzes the endpoints of each side view mirror, the rear-view mirror, and the bottom of the windshield. By understanding where these reference points align with the driver's field of vision, the POV determination module 208 may establish the POV and identify the areas the driver is likely focusing on.

At step 906, a Region of Interest (ROI) for the driver may be determined based on a bounding box regression model and a direction of movement of the vehicle. In some embodiments, the ROI may be determined through the ROI determination module 210.

The ROI determination module 210 may employ the bounding box regression model, which may help to identify a specific area within the captured images or video frames that contains a driver's face or other relevant features. Additionally, the direction of movement of the vehicle is considered. This allows the ROI determination module 210 to refine the ROI and focus on the relevant regions within the captured data.

At step 908, a Line of Gaze (LOG) of the driver may be determined based on the direction of gaze. In some embodiments, the LOG may be determined through the LOG determination module 212.

This may be inferred from driver's eye movements or the movement of their head. By understanding the LOG of the driver, the monitoring device may gain information of where the driver is looking and the specific points of visual engagement. This information is crucial for understanding the driver's attention and focus during different driving scenarios.

At step 910, a distraction level of the driver may be identified while driving the vehicle based on at least one of the POV, the ROI, and the LOG, through an Artificial Intelligence (AI) model 214. By considering the information obtained from the previous steps, including the Plane of Vision (POV), the Region of Interest (ROI), and the Line of Gaze (LOG), the AI model 214 evaluates the level of distraction or attentiveness. This assessment helps in identifying situations where the driver may be distracted or not fully focused on a task of driving.

As will be appreciated by one skilled in the art, a variety of processes may be employed for real-time monitoring of driver in a vehicle. For example, the system 100 and the associated monitoring device 102 may monitor the driver by the processes discussed herein. In particular, as will be appreciated by those of ordinary skill in the art, control logic and/or automated routines for performing the techniques and steps described herein may be implemented by the system 100 and the associated monitoring device 102 either by hardware, software, or combinations of hardware and software. For example, suitable code may be accessed and executed by the one or more microcontrollers on the system 100 to perform some or all of the techniques described herein. Similarly, application specific integrated circuits (ASICs) configured to perform some, or all of the processes described herein may be included in the one or more microcontrollers on the system 100.

Figure 10:
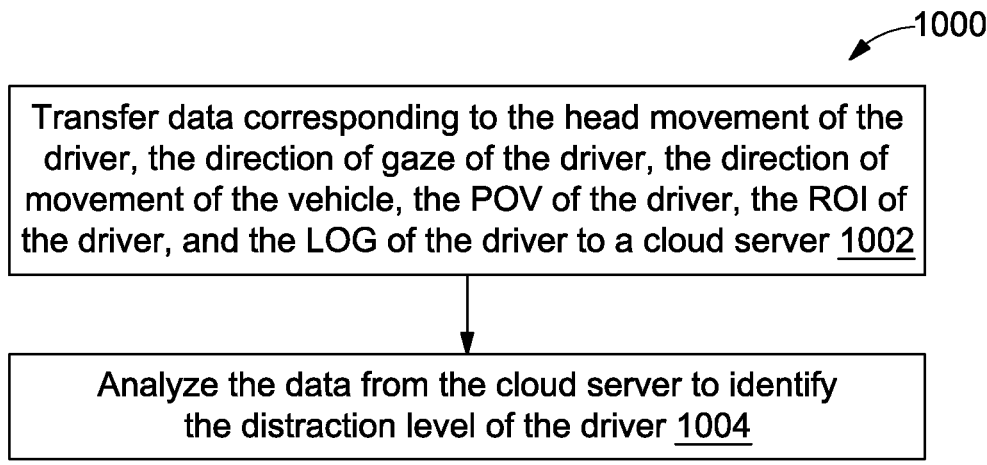
FIG. 10 is a flowchart of a method for transferring data to a cloud server, in accordance with some embodiments of the present disclosure.

Referring now to FIG. 10 is a flowchart of a method 1000 for transferring data to a cloud server, in accordance with some embodiments of the present disclosure. At step 1002, data corresponding to the head movement of the driver, the direction of gaze of the driver, the direction of movement of the vehicle, the POV of the driver, the ROI of the driver, and the LOG of the driver may be transferred to the cloud server 126.

In some embodiments, the data transfer may be facilitated using the internet module 312 (such as an Internet connection or wireless communication) that may connect the onboard system within the vehicle to the cloud server 126. This ensures seamless and efficient transfer of the collected data to the cloud server for further analysis.

Once the data reaches the cloud server 126, at step 1004, the data may be analyzed to identify the distraction level of the driver. Various techniques and algorithms may be applied to analyze the collected data in real-time or in batches. The analysis may include examining relationships and patterns within the data to assess the level of distraction or attentiveness while driving the vehicle.

The data analysis may include comparing the driver's head movements, gaze direction, and vehicle's movement to predefined thresholds or reference values. It may also include evaluating the alignment between the driver's POV, ROI, and LOG to determine if there are indications of distraction or lack of attention. This is further explained in conjunction with FIG. 11 to FIG. 13.

Figure 11:
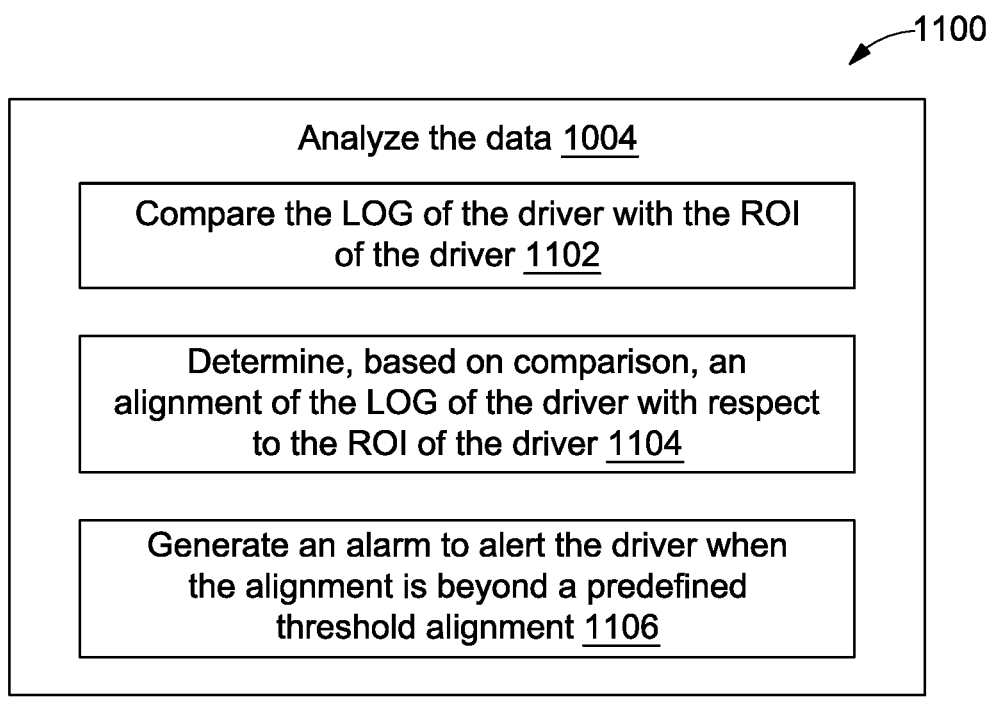
FIG. 11 is a flowchart of a method for analyzing data to identify distraction level of a driver, in accordance with some embodiments of the present disclosure.

Referring now to FIG. 11 is a flowchart of a method 1100 for analyzing data from a cloud server to identify distraction level of a driver, in accordance with some embodiments of the present disclosure. As mentioned via the step 1004, in order to analyze the data, at step 1102, the LOG of the driver may be compared with the ROI of the driver.

At step 1104, based on comparison, an alignment of the LOG of the driver with respect to the ROI of the driver may be determined.

At step 1106, when the alignment is beyond a predefined threshold alignment, an alarm may be generated to alert the driver.

Figure 12:
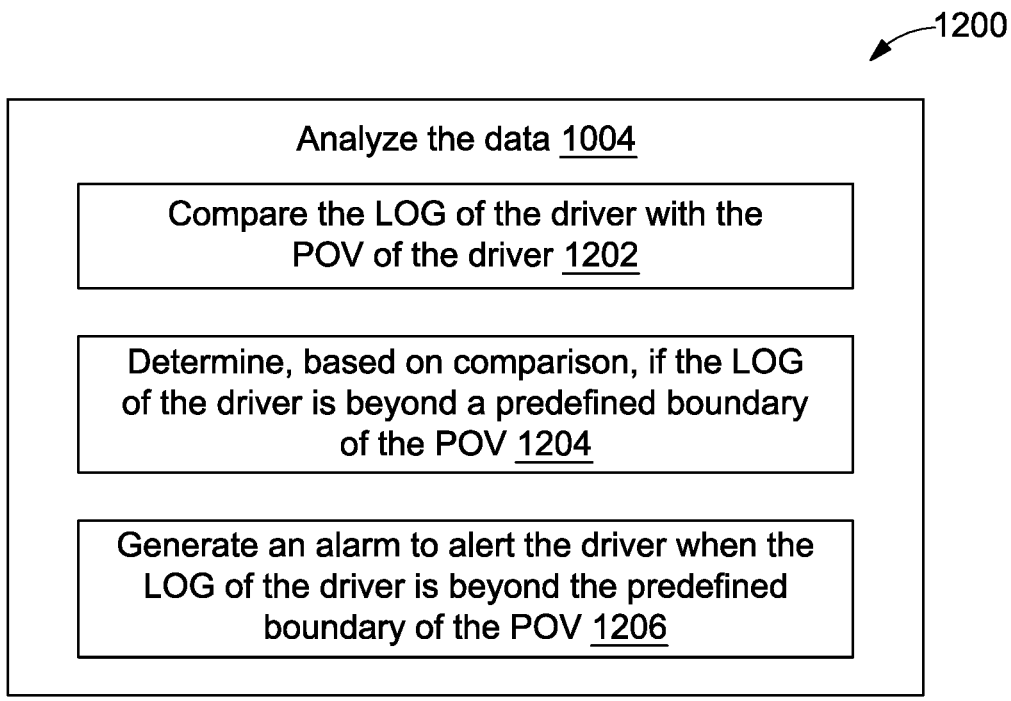
FIG. 12 is another flowchart of a method for analyzing data to identify distraction level of a driver, in accordance with some embodiments of the present disclosure.

Referring now to FIG. 12 is another flowchart of a method 1200 for analyzing data from a cloud server to identify distraction level of a driver, in accordance with some embodiments of the present disclosure. As mentioned via the step 1004, in order to analyze the data, at step 1202, the LOG of the driver may be compared with the POV of the driver.

At step 1204, based on comparison, determine if the LOG of the driver is beyond a predefined boundary of the POV.

At step 1206, when the LOG of the driver is beyond the predefined boundary of the POV, an alarm may be generated to alert the driver.

Figure 13:
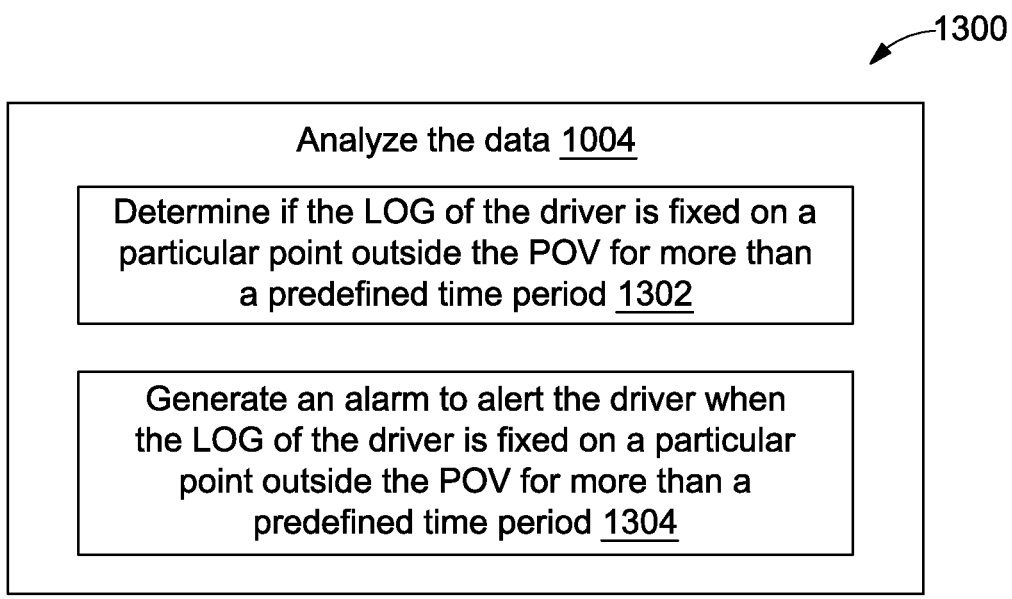
FIG. 13 is another flowchart of a method for analyzing data to identify distraction level of a driver, in accordance with some embodiments of the present disclosure.

Referring now to FIG. 13 is another flowchart of a method 1300 for analyzing data from a microcontroller to identify distraction level of a driver, in accordance with some embodiments of the present disclosure. As mentioned via the step 1004, in order to analyze the data, at step 1302, determine if the LOG of the driver is fixed on a particular point outside the POV for more than a predefined time period. It is important to ensure that the driver's attention remains focused within the designated POV while operating the vehicle. The purpose of this analysis is to identify instances where the driver's attention is consistently diverted from the primary driving task.

At step 1304, when the LOG of the driver is fixed on a particular point outside the POV for more than a predefined time period, an alarm may be generated to alert the driver.

In some embodiments, the AI model may be configured to prevent generation of a false alarm by predicting an intent of driver when the driver is looking beyond the POV. For instance, when the driver looks at the side mirror, the AI model in conjunction with the monitoring device refrains from instantly raising an alarm. Instead, it considers the duration of continuous mirror viewing. If the driver consistently focuses on the mirror for a defined number of successive frames (typically 5 frames), the monitoring device then generates an alarm. However, if the driver's gaze extends beyond the mirrors, indicating a potential distraction, the alarm is raised instantly.

Moreover, a design of the monitoring device offers flexibility to accommodate additional features such as an external camera that monitors the direction of vehicle movement. This feature serves to prevent false alarm triggered by normal driver behaviour, such as looking at road signs or traffic signals. By considering the external camera input, the AI model may distinguish between intentional driver actions and potential hazards on the road, ensuring that alarms are only generated when necessary.

Figure 14:
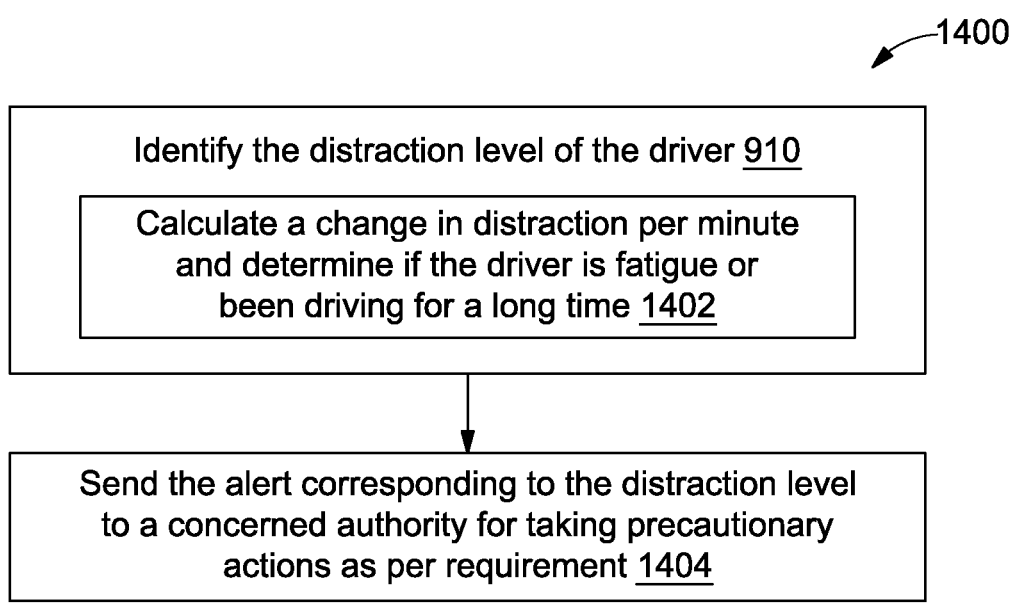
FIG. 14 is a flowchart of a method for sending alert corresponding to a distraction level to a concerned authority, in accordance with some embodiments of the present disclosure.

Referring now to FIG. 14 is a flowchart of a method 1400 for sending alert corresponding to a distraction level to a concerned authority, in accordance with some embodiments of the present disclosure. As mentioned via the step 910, in order to identify the distraction level of the driver, at step 1402, a change in distraction per minute may be calculated and determine if the driver is fatigued or has been driving for a long time.

To further elaborate, the concept of "change in distraction per minute" refers to a metric that may be calculated to evaluate a level distraction experienced by the driver due to driver fatigue or a duration of continuous driving. It may be calculated by dividing the total number of distractions observed by the total duration of driving time. By monitoring a behaviour of driver and attention patterns over time, it becomes possible to analyze a rate at which distractions occur.

For example, when the driver becomes fatigued or has been driving for an extended period, their level of distraction may increase. Distractions may exhibit as deviations from a normal driving behaviour, such as reduced responsiveness, delayed reaction times, or an inability to maintain focus on the road. By quantifying the frequency or intensity of distractions within a specific time frame, the monitoring device may measure the change in distraction per minute.

This information may contribute to proactive measures to ensure driver safety, such as prompting the driver to take rest breaks, adjusting alarm thresholds, or notifying relevant authorities for further intervention if necessary.

Additionally, the distraction/minute metric may be used as a measure of risk assessment for insurance purposes, similar to a credit score used by financial institutions. By customizing the insurance premium based on the distraction/minute score, insurance providers may incentivize safer driving habits and potentially offer lower premiums to drivers who demonstrate lower levels of distraction.

By utilizing this metric, insurance companies can better assess the individual driver's risk profile and adjust insurance premiums accordingly. Drivers with lower distraction per minute scores, indicating higher levels of attentiveness and safer driving habits, may be rewarded with lower premiums, while drivers with higher distraction per minute scores may be subject to higher premiums due to their increased risk profile.

At step 1404, the alert corresponding to the distraction level may be sent to a concerned authority via a communication network (for example, via SMS, emails, etc.) for taking precautionary actions as per requirement. The concerned authority may include, but is not limited to, a hospital or healthcare institution, insurance companies, transportation authorities, law enforcement agencies, fleet management companies, or occupational safety and health authorities.

In some embodiments, the data may be anonymized before sending it to the concerned authority. The anonymized data may be employed by the AI model to identify the distraction level of the driver while preserving a privacy and confidentiality of driver information.

In other words, in order to protect a privacy of in-cabin driver, the monitoring device incorporates anonymization techniques. In particular, instead of transmitting an original image of the driver to a remote server or a concern authority, the monitoring device anonymizes the entire image data to ensure privacy. The anonymization process maintains the distribution of data while concealing the driver's identity. If required for specific authorities or special cases, the anonymized image may be reconstructed. This approach of anonymization is crucial to maintain a trust of users in the monitoring device.

The present disclosure utilizes a generative adversarial network (GAN) and masking based in-cabin monitoring approach for attention detection of the driver. This approach generates a virtual face that replicates real-facial expressions while incorporating contextual masking to provide facial anonymity to the driver during monitoring. This approach enables the system to provide essential facial information for detection and monitoring purposes while avoiding any potential privacy concerns or irregular situations.

As will be appreciated by those skilled in the art, the techniques described in the various embodiments discussed above are not routine, or conventional, or well understood in the art. The techniques discussed above provide for real-time monitoring of driver in a vehicle. The techniques first capture, via a camera, at least one of the head movement, the steering direction, or the direction of gaze of the driver present in the vehicle. The techniques may then utilize various parameters to determine the driver's Plane of Vision (POV), Region of Interest (ROI), and monitor their line of gaze. The techniques may initially determine the POV based on the endpoints of the side mirrors, which serve as reference points for the driver's primary field of view.

To further refine the analysis, the techniques may then consider the ROI by taking into account the direction of the movement of the vehicle. By combining the information from the vehicle's indicators and speedometer, the techniques may establish the expected ROI corresponding to the driver's intended direction.

The techniques may then compare the ROI with the driver's line of gaze to assess their alignment. If the ROI and line of gaze overlap within the designated POV, no alarm is generated. This is because the driver may be focusing on road signs, checking their mirrors, or performing other tasks within the expected field of view.

However, if the driver's line of gaze extends beyond the designated POV, indicating a diversion of attention from the driving task, the techniques may trigger an alarm instantly. This may be important to alert the driver and refocus their attention back to the road and potential hazards.

By integrating the information from side mirrors, ROI, LOG, and vehicle indicators, the techniques may effectively detect instances where the driver's attention deviates from the safe driving area. The techniques may help to enhance driver awareness, minimize distractions, and maintain a focus on the road, ultimately contributing to improved road safety.

The techniques discussed above provide various advantages, such as, capable of providing an effective monitoring technique by utilizing the driver's plane of vision, which is determined based on the vehicle's dimensions, as well as considering the region of Interest determined by the vehicle's line of movement (indicators, steering, speed) and the driver's line of gaze. Further, the disclosed techniques are capable of reducing false alarms by taking into consideration factors such as the Plane of Vision, the number of frames analyzed, the driver's line of gaze, and the Region of Interest. Further, the disclosed techniques are capable of calculating the level of distraction per minute to assess the driver's level of distraction and monitor their attentiveness. The distraction level may be utilized for various industries like insurance (Personalized Premium calculation), traffic control (customized traffic violation ticket), etc. Further, the disclosed techniques are capable of providing an early warning system through issuing audio-visual alarms on-site to alert the driver of impending driving failures and may also send SMS or email notifications to the concerned authorities to take necessary precautions when required. Furthermore, the disclosed techniques ensures data anonymization while retaining contextual information, prioritizing privacy, and security. The data anonymization is done on an image of the driver using generative AI (for example, GAN).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 15:
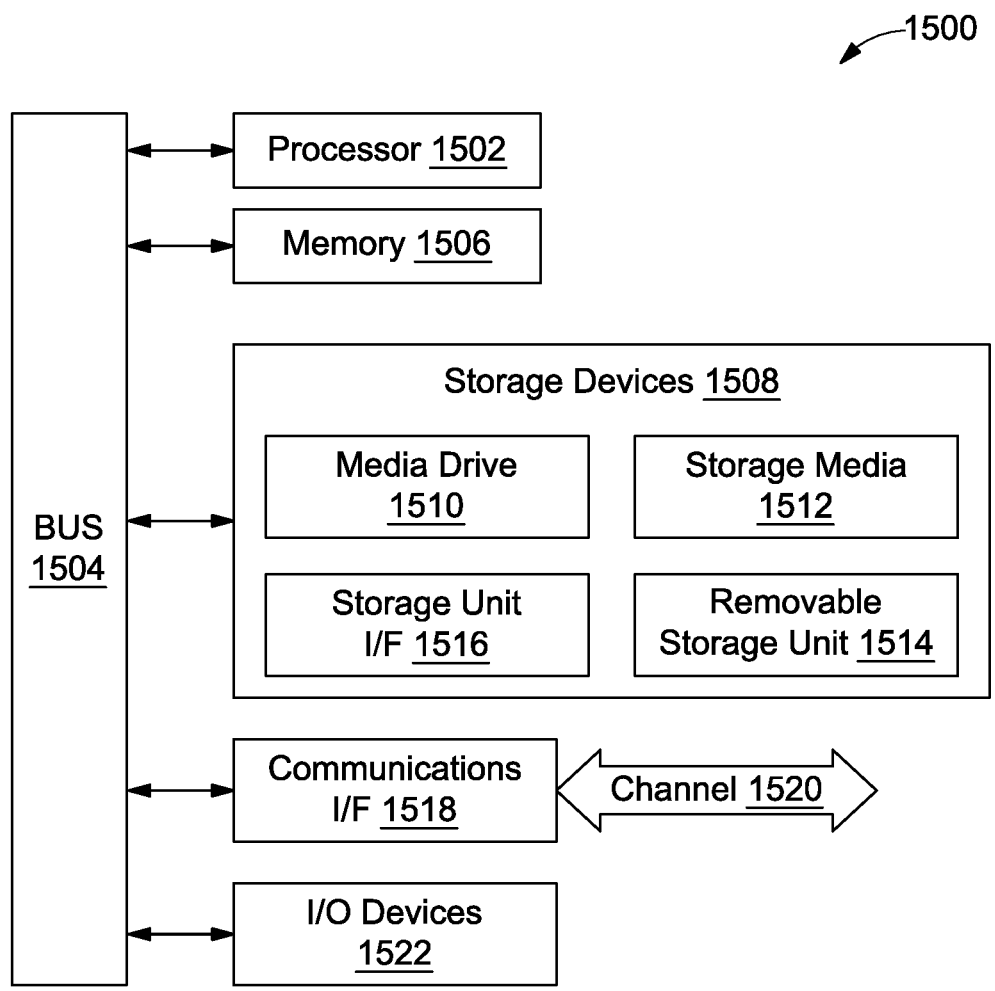
FIG. 15 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 15, an exemplary computing system 1500 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1500 may represent, for example, a user device such as a desktop, a laptop, a mobile phone, personal entertainment device, DVR, and so on, or any other type of special or general-purpose computing device as may be desirable or appropriate for a given application or environment. The computing system 1500 may include one or more processors, such as a processor 1502 that may be implemented using a general or special purpose processing engine such as, for example, a microprocessor, microcontroller, or other control logic. In this example, the processor 1502 is connected to a bus 1504 or other communication medium. In some embodiments, the processor 1502 may be an Artificial Intelligence (AI) processor, which may be implemented as a Tensor Processing Unit (TPU), or a graphical processor unit, or a custom programmable solution Field-Programmable Gate Array (FPGA).

The computing system 1500 may also include a memory 1506 (main memory), for example, Random Access Memory (RAM) or other dynamic memory, for storing information and instructions to be executed by the processor 1502. The memory 1506 also may be used for storing temporary variables or other intermediate information during execution of instructions to be executed by the processor 1502. The computing system 1500 may likewise include a read only memory ("ROM") or other static storage device coupled to bus 904 for storing static information and instructions for the processor 902.

The computing system 1500 may also include a storage device 1508, which may include, for example, a media drive 1510 and a removable storage interface. The media drive 1510 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 1512 may include, for example, a hard disk, magnetic tape, flash drive, or other fixed or removable medium that is read by and written to by the media drive 1510. As these examples illustrate, the storage media 1512 may include a computer-readable storage medium having stored therein particular computer software or data.

In alternative embodiments, the storage devices 1508 may include other similar instrumentalities for allowing computer programs or other instructions or data to be loaded into the computing system 1500. Such instrumentalities may include, for example, a removable storage unit 1514 and a storage unit interface 1516, such as a program cartridge and cartridge interface, a removable memory (for example, a flash memory or other removable memory module) and memory slot, and other removable storage units and interfaces that allow software and data to be transferred from the removable storage unit 1514 to the computing system 1500.

The computing system 1500 may also include a communications interface 1518. The communications interface 1518 may be used to allow software and data to be transferred between the computing system 1500 and external devices. Examples of the communications interface 1518 may include a network interface (such as an Ethernet or other NIC card), a communications port (such as for example, a USB port, a micro-USB port), Near field Communication (NFC), etc. Software and data transferred via the communications interface 1518 are in the form of signals which may be electronic, electromagnetic, optical, or other signals capable of being received by the communications interface 1518. These signals are provided to the communications interface 1518 via a channel 1520. The channel 1520 may carry signals and may be implemented using a wireless medium, wire or cable, fiber optics, or other communications medium. Some examples of the channel 1520 may include a phone line, a cellular phone link, an RF link, a Bluetooth link, a network interface, a local or wide area network, and other communications channels.

The computing system 1500 may further include Input/Output (I/O) devices 1522. Examples may include, but are not limited to a display, keypad, microphone, audio speakers, vibrating motor, LED lights, etc. The I/O devices 1522 may receive input from a user and also display an output of the computation performed by the processor 1502. In this document, the terms "computer program product" and "computer-readable medium" may be used generally to refer to media such as, for example, the memory 1506, the storage devices 1508, the removable storage unit 1514, or signal(s) on the channel 1520. These and other forms of computer-readable media may be involved in providing one or more sequences of one or more instructions to the processor 902 for execution. Such instructions, generally referred to as "computer program code" (which may be grouped in the form of computer programs or other groupings), when executed, enable the computing system 1500 to perform features or functions of embodiments of the present invention.

In an embodiment where the elements are implemented using software, the software may be stored in a computer-readable medium and loaded into the computing system 1500 using, for example, the removable storage unit 1514, the media drive 1510 or the communications interface 1518. The control logic (in this example, software instructions or computer program code), when executed by the processor 1502, causes the processor 1502 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

It is intended that the disclosure and examples be considered as exemplary only, with a true scope and spirit of disclosed embodiments being indicated by the following claims.

What is claimed is:

1. A method for real-time monitoring of driver in a vehicle, the method comprising:
   capturing, by a monitoring device and via a camera installed within the vehicle, at least one of a head movement, a steering direction, and a direction of gaze of the driver present in the vehicle;
   determining, by the monitoring device, a Plane of Vision (POV) of the driver based on endpoints of each side view mirrors, a rear-view mirror, and bottom of a windshield of the vehicle, wherein the POV defines a 3D reference plane specific to a configuration of the vehicle;
   dynamically determining, by the monitoring device, a Region of Interest (ROI) for the driver based on a bounding box regression model configured to update in response to the real-time direction of gaze of the driver and a direction of movement of the vehicle;

determining, by the monitoring device, a Line of Gaze (LOG) of the driver represented by a 3D directional vector based on the direction of gaze; and identifying, by the monitoring device, a distraction level of the driver while driving the vehicle based on at least one of the POV, the ROI, and the LOG, using an Artificial Intelligence (AI) model.

2. The method of claim 1, further comprising:

transferring, via a communication network, data corresponding to the head movement of the driver, the direction of gaze of the driver, the direction of movement of the vehicle, the POV of the driver, the ROI of the driver, and the LOG of the driver to a cloud server, wherein the direction of movement of the vehicle is identified by the steering direction, light indicators of the vehicle, and speed of the vehicle; and analyzing, by the AI model, the data from the cloud server to identify the distraction level of the driver.

3. The method of claim 2, wherein analyzing the data further comprises:

comparing the LOG of the driver with the ROI of the driver;

determining, based on comparison, an alignment of the LOG of the driver with respect to the ROI of the driver; and generating an alarm to alert the driver when the alignment is beyond a predefined threshold alignment.

4. The method of claim 2, wherein analyzing the data further comprises:

comparing the LOG of the driver with the POV of the driver;

determining, based on comparison, if the LOG of the driver is beyond a predefined boundary of the POV; and generating an alarm to alert the driver when the LOG of the driver is beyond the predefined boundary of the POV.

5. The method of claim 2, wherein analyzing the data further comprises:

determining if the LOG of the driver is fixed on a particular point outside the POV for more than a predefined time period; and generating an alarm to alert the driver when the LOG of the driver is fixed on a particular point outside the POV for more than a predefined time period.

6. The method of claim 1, further comprising sending, via the communication network, the alert corresponding to the distraction level to a concerned authority for taking precautionary actions as per requirement.

7. The method of claim 1, wherein the AI model is configured to prevent generation of a false alarm by predicting an intent of driver when the driver is looking beyond the POV.

8. The method of claim 1, wherein identifying the distraction level of the driver further comprises calculating a change in distraction per minute and determine if the driver is fatigued or has been driving for a long time.

9. The method of claim 1, further comprising anonymizing the data without losing context, wherein the anonymized data is employed by the AI model to identify the distraction level of the driver while preserving a privacy and confidentiality of driver information.

10. A system for real-time monitoring of driver in a vehicle, the system comprising:
a processor; and a memory communicatively coupled to the processor, wherein the memory stores processor instructions, which when executed by the processor, cause the processor to:

capture, via a camera installed within the vehicle, at least one of a head movement, a steering direction, and a direction of gaze of the driver present in the vehicle;

determine a Plane of Vision (POV) of the driver based on endpoints of each side view mirrors, a rear-view mirror, and bottom of a windshield of the vehicle, wherein the POV defines a 3D reference plane specific to a configuration of the vehicle;

dynamically determine a Region of Interest (ROI) for the driver based on a bounding box regression model configured to update in response to the real-time direction of gaze of the driver and a direction of movement of the vehicle;

determine a Line of Gaze (LOG) of the driver based represented by 3D directional vector on the direction of gaze; and identify a distraction level of the driver while driving the vehicle based on at least one of the POV, the ROI, and the LOG, using an Artificial Intelligence (AI) model.

11. The system of claim 10, wherein the processor instructions, when executed by the processor, further cause the processor to:

transfer, via a communication network, data corresponding to the head movement of the driver, the direction of gaze of the driver, the direction of movement of the vehicle, the POV of the driver, the ROI of the driver, and the LOG of the driver to a cloud server, wherein the direction of movement of the vehicle is identified by the steering direction, light indicators of the vehicle, and speed of the vehicle; and analyze, by the AI model, the data from the cloud server to identify the distraction level of the driver.

12. The system of claim 11, wherein to analyze the data, the processor instructions, when executed by the processor, cause the processor to:

compare the LOG of the driver with the ROI of the driver;

determine, based on comparison, an alignment of the LOG of the driver with respect to the ROI of the driver; and generate an alarm to alert the driver when the alignment is beyond a predefined threshold alignment.

13. The system of claim 11, wherein to analyze the data, the processor instructions, when executed by the processor, further cause the processor to:

compare the LOG of the driver with the POV of the driver;

determine, based on comparison, if the LOG of the driver is beyond a predefined boundary of the POV; and generate an alarm to alert the driver when the LOG of the driver is beyond the predefined boundary of the POV.

14. The system of claim 11, wherein to analyze the data, the processor instructions, when executed by the processor, further cause the processor to:

determine if the LOG of the driver is fixed on a particular point outside the POV for more than a predefined time period; and generate an alarm to alert the driver when the LOG of the driver is fixed on a particular point outside the POV for more than a predefined time period.

15. The system of claim 10, wherein the processor instructions, when executed by the processor, further cause the processor to send, via the communication network, the alert corresponding to the distraction level to a concerned authority for taking precautionary actions as per requirement.

16. The system of claim 10, wherein the AI model is configured to prevent generation of a false alarm by predicting an intent of driver when the driver is looking beyond the POV.

17. The system of claim 10, wherein to identify the distraction level of the driver, the processor instructions, when executed by the processor, cause the processor to calculate a change in distraction per minute and determine if the driver is fatigued or has been driving for a long time.

18. The system of claim 10, wherein the processor instructions, when executed by the processor, further cause the processor to anonymize the data without losing context, wherein the anonymized data is employed by the AI model to identify the distraction level of the driver while preserving a privacy and confidentiality of driver information.

19. A computer program product for real-time monitoring of driver in a vehicle, the computer program product being embodied in a non-transitory computer readable storage medium of a monitoring device and comprising computer instructions for:

capturing, by a monitoring device and via a camera installed within the vehicle, at least one of a head movement, a steering direction, and a direction of gaze of the driver present in the vehicle;

determining, by the monitoring device, a Plane of Vision (POV) of the driver based on endpoints of each side view mirrors, a rear-view mirror, and bottom of a windshield of the vehicle, wherein the POV defines a 3D reference plane specific to a configuration of the vehicle;

dynamically determining, by the monitoring device, a Region of Interest (ROI) for the driver based on a bounding box regression model configured to update in response to the real-time direction of gaze of the driver and a direction of movement of the vehicle;

determining, by the monitoring device, a Line of Gaze (LOG) of the driver represented by a 3D directional vector based on the direction of gaze; and identifying, by the monitoring device, a distraction level of the driver while driving the vehicle based on at least one of the POV, the ROI, and the LOG, using an Artificial Intelligence (AI) model.

20. The computer program product of claim 19, wherein the computer instructions further configured for:

transferring, via a communication network, data corresponding to the head movement of the driver, the direction of gaze of the driver, the direction of movement of the vehicle, the POV of the driver, the ROI of the driver, and the LOG of the driver to a cloud server, wherein the direction of movement of the vehicle is identified by the steering direction, light indicators of the vehicle, and speed of the vehicle; and analyzing, by the AI model, the data from the cloud server to identify the distraction level of the driver.

* * * * *